(12) United States Patent
Christmas et al.

(10) Patent No.: US 9,463,958 B2
(45) Date of Patent: Oct. 11, 2016

(54) CHAIN

(71) Applicant: Renold PLC, Manchester (GB)

(72) Inventors: Michael Charles Christmas, Cheshire (GB); Torquil Edmund Pyper, Oxfordshire (GB)

(73) Assignee: Renold Plc., Manchester (GB)

( * ) Notice: Subject to any disclaimer, the term of this patent is extended or adjusted under 35 U.S.C. 154(b) by 0 days.

(21) Appl. No.: 14/436,695

(22) PCT Filed: Oct. 18, 2013

(86) PCT No.: PCT/GB2013/052729
§ 371 (c)(1),
(2) Date: Apr. 17, 2015

(87) PCT Pub. No.: WO2014/060775
PCT Pub. Date: Apr. 24, 2014

(65) Prior Publication Data
US 2016/0031679 A1    Feb. 4, 2016

(30) Foreign Application Priority Data

Oct. 19, 2012  (GB) .................................. 1218800.9
Oct. 26, 2012  (GB) .................................. 1219281.1
Dec. 20, 2012  (GB) .................................. 1223073.6
Jan. 15, 2013  (GB) .................................. 1300689.5
Mar. 8, 2013  (GB) .................................. 1304231.2
Mar. 28, 2013  (GB) .................................. 1305756.7

(51) Int. Cl.
*F16G 13/12*    (2006.01)
*B66C 1/12*    (2006.01)
(Continued)

(52) U.S. Cl.
CPC .............. *B66C 1/125* (2013.01); *A01K 1/064* (2013.01); *B21L 11/02* (2013.01); *F16F 7/00* (2013.01);
(Continued)

(58) Field of Classification Search
CPC ........ B66C 1/125; A16D 3/74; A01K 1/064; F16G 13/06; F16G 13/18; B21L 11/02; F16F 7/00; F16F 9/14; F16F 9/3207; F16F 9/54
USPC ............................................ 59/78.2, 4, 5, 93
See application file for complete search history.

(56) References Cited

U.S. PATENT DOCUMENTS 2,080,627 A * 5/1937 Morgan .................... F16D 3/74
                                                                403/220
2,667,792 A   2/1954 Bendall
(Continued)

FOREIGN PATENT DOCUMENTS

CN      201705871       1/2011
DE      1087413 B       8/1960
(Continued)

OTHER PUBLICATIONS

GB1305756.7 Search Report from the United Kingdom Intellectual Property Office dated Sep. 27, 2013 (1 page).
(Continued)

*Primary Examiner* — David B Jones
(74) *Attorney, Agent, or Firm* — Michael Best & Friedrich LLP

(57) ABSTRACT

A chain has inner and outer links pivotally interconnected by transverse pins. In a straight configuration the links are substantially aligned in a linear direction. At least one resilient elongate flexible member is threaded along at least part of the length of the chain between the pins in alternate directions so as to force adjacent links of the chain to articulate out of the straight configuration. A chain in this form may be proof loaded before service by applying a tensile load and the elongate flexible member may be removed. A chain assembly comprises a plurality of said chains running between first and second connection brackets.

23 Claims, 17 Drawing Sheets

(51) Int. Cl.
*A01K 1/064* (2006.01)
*F16G 13/06* (2006.01)
*F16F 7/00* (2006.01)
*F16G 13/18* (2006.01)
*F16F 9/14* (2006.01)
*F16F 9/32* (2006.01)
*F16F 9/54* (2006.01)
*B21L 11/02* (2006.01)

(52) U.S. Cl.
CPC ............... *F16F 9/14* (2013.01); *F16F 9/3207* (2013.01); *F16F 9/54* (2013.01); *F16G 13/06* (2013.01); *F16G 13/18* (2013.01)

(56) References Cited

U.S. PATENT DOCUMENTS

| | | | | |
|---|---|---|---|---|
| 3,775,969 | A * | 12/1973 | Vasterling | B60C 27/006 152/240 |
| 3,948,114 | A | 4/1976 | Koinzan | |
| 4,489,548 | A * | 12/1984 | Derman | B63B 21/20 267/153 |
| 7,461,501 | B1 * | 12/2008 | Bajema | A01K 1/064 59/78 |
| 8,002,658 | B2 | 8/2011 | Morishige et al. | |
| 8,336,286 | B2 | 12/2012 | Veltrop et al. | |
| 2005/0049099 | A1 | 3/2005 | Morishige | |
| 2009/0124445 | A1 | 5/2009 | Morishige et al. | |
| 2012/0311990 | A1 | 12/2012 | Dunham et al. | |
| 2014/0329632 | A1 | 11/2014 | Kranz et al. | |
| 2016/0031679 | A1 * | 2/2016 | Christmas | B66C 1/125 59/86 |

FOREIGN PATENT DOCUMENTS

| | | |
|---|---|---|
| DE | 8619069 | 9/1986 |
| DE | 20112246 | 12/2002 |
| DE | 102007030848 | 2/2008 |
| EP | 1059467 | 12/2000 |
| FR | 854423 | 4/1940 |
| GB | 1020087 | 2/1966 |
| JP | 2203887 | 8/1990 |
| JP | 07172786 A | 7/1995 |
| JP | 09151998 | 6/1997 |
| SU | 492695 | 11/1975 |
| SU | 626287 | 9/1978 |

OTHER PUBLICATIONS

GB1218800.9 Search Report from the United Kingdom Intellectual Property Office dated Jan. 24, 2013 (1 page).
PCT/GB2013/052731 International Search Report and Written Opinion dated Feb. 10, 2014 (7 pages).
International Search Report and Written Opinion for International Application No. PCT/GB2013/052729 dated Feb. 10, 2014 (8 pages).

* cited by examiner

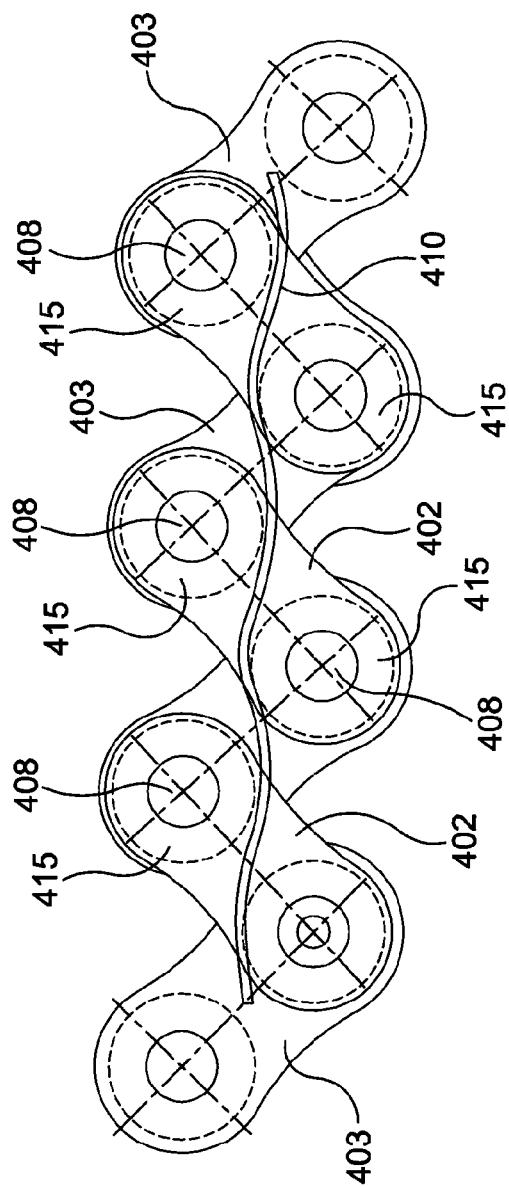
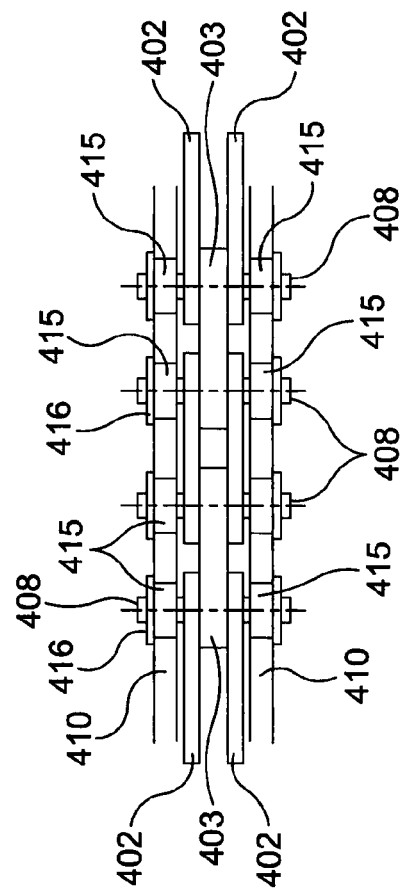
FIGURE 6
FIGURE 7

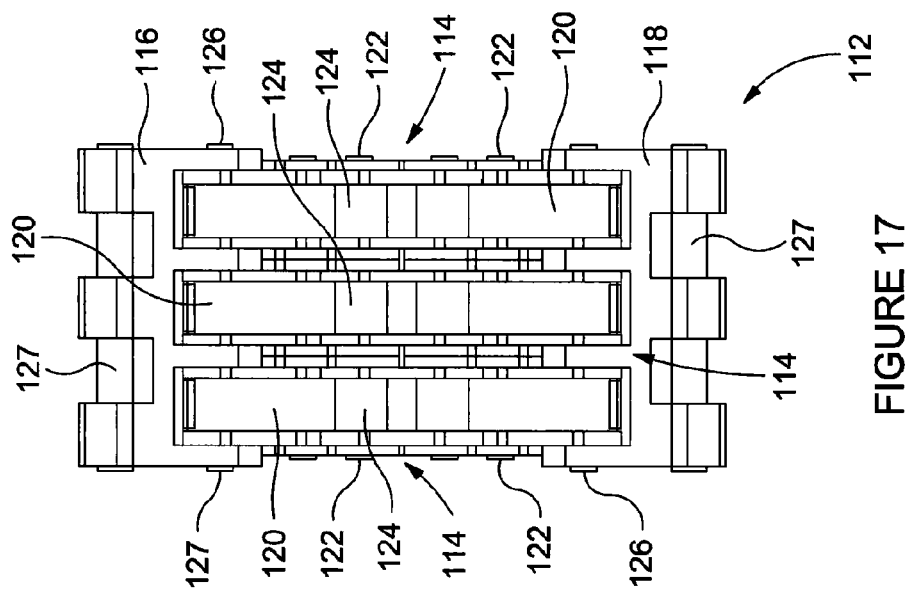
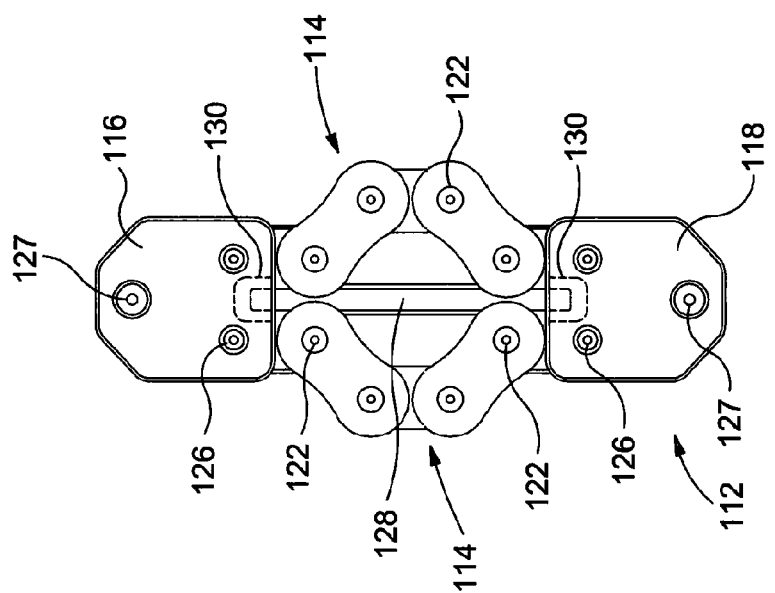

CHAIN

CROSS-REFERENCE TO RELATED APPLICATIONS

This patent application is a national stage filing under 35 U.S.C. 371 of International Patent Application No. PCT/GB2013/052729, filed Oct. 18, 2013 which claims priority to United Kingdom Patent Application No. 1218800.9, filed Oct. 19, 2012 and United Kingdom Patent Application No. 1219281.1, filed Oct. 26, 2012 and United States Kingdom Patent Application No. 1223073.6, filed Dec. 20, 2012 and United Kingdom Patent Application No. 1300689.5, filed Jan. 15, 2013 and United Kingdom Patent Application No. 1304231.2, filed Mar. 8, 2013 and United Kingdom Patent Application No. 1305756.7, filed Mar. 28, 2013, the entire contents of all of which are hereby incorporated by reference herein.

BACKGROUND

The present invention relates to a chain of the kind that comprises a plurality of interconnected and articulating links.

A length of chain typically comprises a plurality of interlaced link plates that are joined by transverse pins such that the links are able to articulate about the pins. One typical chain comprises inner links comprising a pair of parallel opposed inner link plates, the inner links being connected together along the length of the chain by means of outer link plates. The transverse pins extend between the opposed pairs of inner link plates and are arranged so as to interconnect the inner and outer link plates by passing through aligned holes in overlapping link plates. The pins are fixed relative to the outer link plates (by, for example, an interference fit) and the inner link plates are free to rotate on the pins.

SUMMARY

Such chains may be used in the mechanical transmission of force or power. For example may be used to lift loads. When such chains operate under load they may be prone to wear, fatigue and ultimately may break.

It is one object of the present invention to obviate or mitigate the aforesaid disadvantages. It is also an object of the present invention to provide for an improved or alternative chain.

According to a first aspect of the present invention there is provided a chain having a longitudinal axis and comprising a plurality of links pivotally interconnected by transverse articulation elements, the chain having a straight configuration in which the links are substantially aligned in a linear direction and at least one resilient elongate flexible member threaded along at least part of the length of the chain between the articulation elements in alternate directions so as to force adjacent links of the chain to articulate out of the straight configuration.

When the chain is subjected to a tensile load the links tend towards the straight configuration but are resisted by the elongate flexible member, which may deflect as a consequence. For example, it is bent out of its plane. The elongate flexible member may be of linear form before it is threaded between the chain links (i.e. in a relaxed state) and is deflected into an undulating form as the chain links articulate towards the straight configuration. The elongate flexible member is resilient such that when the tensile load is removed it returns to its original shape i.e. it tends towards the straight, linear configuration but may be prevented from being perfectly straight by virtue of the chain links.

The resilient elongate flexible member thus acts in a manner analogous to a spring. The reactive force may act in the manner of a spring constant in that it may change in proportion to the tensile load applied. It may change in a linear or non-linear relationship. The magnitude of the reactive force may be dependent on a combination of the configuration and geometry of the flexible element and the mechanism of the chain elements. In one embodiment the flexible element acts like a constant-force spring such that the force it exerts over its range of motion is a constant.

The resilient elongate flexible member applies a reactive force to the chain links when the chain is subjected to a tensile load, by virtue of it being bent and its resilience. The tensile load forces the chain links to move towards the straight configuration but the reactive force of the elongate flexible member acts on individual chain links so as to resist such movement.

The elongate flexible member may be threaded through the chain such that it passes alternately above and below successive articulation elements i.e. it passes on opposite sides of successive articulation elements. It will be appreciated that the elongate flexible member may be threaded through the chain such that it passes between articulation elements in opposite directions but not necessarily between successive articulation elements. It may not be threaded between one or more articulation elements in any given length of chain.

The elongate flexible member may be discontinuous along the length of the chain. For example it may comprise a plurality of pieces each of which extends along part of the length of the chain. The pieces may be made of different materials and may be of different shape and configuration. The pieces may be in the form of sprung strips e.g. plates of resilient material such as spring steel. The pieces may threaded in alternative directions such that they pass under and over successive articulation elements or such that they pass under two or more articulation elements before passing over one or more articulation elements or vice versa.

One or both ends of the pieces may be hooked or otherwise bent so as to prevent them from being dislodged from the links. One or more ends may be received in a slot defined in a component of the chain such as a roller, a bush or an articulation element.

The elongate flexible member may vary in cross-sectional area along the length of the chain. For example, the thickness of the member may vary along the length of the chain. The variation in thickness presents different stiffness along the length of the chain. Similarly, the elongate flexible member may vary in width as it progresses along the length of the chain.

There may be provided a plurality of elongate flexible members disposed in a side-by-side relationship along the length of the chain. These may be continuous or discontinuous or a combination thereof. At least one of the members may have a constant cross-sectional area and at least one may have a variable cross-sectional area along its length.

The chain may have rollers arranged for rotation around the articulation elements. The elongate flexible member may be threaded so as to bear against the rollers. The rollers may be rotatably disposed on a respective bush that receives a respective articulation element. The rollers may be disposed between links (e.g. on the longitudinal axis of the chain) or may be disposed outboard of the links (i.e. laterally displaced from the longitudinal axis).

In an alternative embodiment the rollers may be omitted and the elongate flexible member may be threaded so as to bear against bushes that receive the articulation elements. In a further alternative embodiment the bushes may be omitted and the member may bear directly against the articulation element.

The articulation elements may be pins (substantially cylindrical or otherwise) or of any other suitable form to permit articulation of the links.

The links may comprise inner link members interconnected by outer link members, the inner link members being free to articulate about the transverse articulation elements and the outer link members being fixed relative to the articulation elements.

The elongate flexible member may be disposed between inner link members on each side of the chain. It may extend across a gap between the inner link members.

The inner or the outer links may be in the form of plates. For example, in one embodiment the inner link plates are arranged in opposed pairs, aligned on opposite sides of the longitudinal axis. The outer link plates interconnect adjacent inner link plates on each side.

The chain may be a standard transmission chain. For example it may conform to ISO606.

The elongate flexible member may in the form of one or more thin strips of material. The strip(s) may have planar surfaces. The strip(s) may have a width that extends between inner link plates. Alternatively it may be in the form of one or more wires. It may be disposed so that it coincides with the central longitudinal axis of the chain or may be offset therefrom.

The resilient elongate flexible member may provide damping. This may be by virtue of movement of the links relative to the elongate flexible member, the friction between the two providing sufficient energy losses to achieve effective damping. Alternatively, or in addition, damping may be designed into the chain by virtue of the resilient elongate flexible member comprising a suitable elastomeric material that absorbs some of the energy. In one embodiment the resilient elongate flexible member comprises an elastomeric polymer. The member may wholly comprise such a material or may be made in part from such material. For example, the resilient elongate flexible member may comprise a core material and an elastomeric polymer coating, such as, for example, nitrile rubber or other synthetic rubber copolymer. The core material may be any suitable material that has sufficient stiffness such as a metal. One example is steel and preferably a spring steel.

The resilient elongate flexible element may comprise an injection mouldable polymer such as, for example, a thermoplastic polyester elastomer. It will be appreciated that any suitable synthetic or natural polymer may be used provided it affords the necessary resilience and flexibility.

The resilient elongate flexible member may have a plurality of protuberances spaced apart along its length for contact with the links of the chain, preferably rollers of the chain. The protuberances are designed to provide a damping effect. They are therefore preferably resiliently compressible. The size and/or shape and/or spacing of the protuberances may vary along the length of the chain in order to vary the damping characteristics along the chain length. The protuberances may be disposed on opposed (e.g. upper and lower) surfaces of the elongate flexible element. They may be disposed such that they are located on alternate sides along the length of the chain.

In such an embodiment in which the chain has rollers, the rollers may contact the elongate flexible element between adjacent protuberances. A pair of spaced protuberances may contact a roller at spaced locations along the external surface of the roller.

In one embodiment the resilient elongate flexible member may be bonded to at least some of the links.

The resilient elongate flexible member may be inserted during assembly of the chain links or it may be inserted after assembly. In one embodiment at least part of the elongate flexible member is injected or otherwise moulded between the chain links and may be bonded to the chain links. The resilient elongate flexible member may fill a void defined between the chain links, preferably between rollers of the chain links. In particular, the resilient elongate flexible member may define arcuate surfaces complementary to those of the rollers for receipt of those rollers.

In a further alternative, one or more moving parts of the chain may be coated with a viscous damping grease. The moving parts may be one or more selected from the group comprising the links, rollers, pins, bushes or the elongate flexible member (in embodiments where it is constructed from a plurality of parts). The damping grease may be manufactured from viscous synthetic oil. The damping grease may also have the effect of reducing the noise of the chain in use. The damping grease may have a viscosity in the region of 30,000-70,000 cSt and preferably around 50,000 cSt.

In an embodiment of the chain in which there are rollers, these may be made from a suitable elastomeric damping material. This may be a polymeric damping material. The material may be injection mouldable. The size and/or thickness of the rollers may vary along the length of the chain in order to provide different damping characteristics along the chain. Alternatively, or in addition, the material of the rollers may vary along the length of the chain.

The chain may be disposed between guide members for guiding movement of the chain.

The chain may be stored in a spiral configuration. In one embodiment it is stored in a spiral configuration. A housing may define a spiral volume having a first open end and a second open end. The housing may be in the form of one or more guide rails. The chain may have a first end that projects from the first open end where it may be fixed to a suitable anchor point. The chain may have a second end that projects from the second open end of the housing, the second end being connectable directly or indirectly to a load. When loaded the chain is arranged to move relative to the rails to an extended position.

The guide members may be movable towards and away from each other so as to force the chain between a first position in which the elongate flexible member is relaxed and a second position in which it is deformed and applies a reactive force to the links of the chain. The rollers of the chain may bear against the guide members. The guide members may be of any suitable form. One of the guide members may be fixed and may be provided by the ground. A first end of the chain may be fixed to an anchor and a second end of the chain may be free to move in a direction laterally of the direction of relative movement of the guide member. The second end of the chain may be connected to an actuator or to means for converting the work done into other energy forms.

At least one of guide member may form part of a housing that receives at least part of the chain. The housing may be deformable in a direction transverse to the longitudinal direction of the chain, and preferably substantially perpendicular to that direction. The housing may have one of more deformable walls that interconnect the guide members. At least one of the guide members may be provided by or on an internal protuberance of the housing. The protuberance may define an abutment surface for contact with the chain. The surface may be planar or otherwise shaped surfaces and may contact rollers of the chain.

The chain may be connected to a damper that may be disposed in the housing. The damper may be a piston and pneumatic or hydraulic cylinder assembly.

An end of the chain may be connected directly or indirectly to a moveable member such as a piston that is slidable in a housing (e.g. a cylinder) such that a force applied to the chain (via a housing, guide members or otherwise) in one direction is converted into translation of the movable member in a substantially perpendicular direction. The chain may be connected to electromagnetic means or piezoelectric means for converting the movement of the chain into electrical energy.

The elongate flexible member may have piezoelectric properties such that its deformation or flexing may generate an electrical charge. It may be made from any material that generates an electrical charge on deformation.

According to a second aspect of the present invention there is provided a method for proof loading a chain, the chain having a longitudinal axis and comprising a plurality of links pivotally interconnected by transverse articulation elements, the chain having a straight configuration in which the links are substantially aligned in a linear direction, the method comprising threading a resilient elongate flexible member along at least part of the length of the chain between the articulation elements in alternate directions so as to force adjacent links of the chain to articulate out of the straight configuration, and then applying a load to the chain so as to move the chain towards the straight configuration and to deflect the elongate flexible member.

The resilient elongate flexible member may be normally of a straight (linear) configuration when it is relaxed i.e. it is unbent. As the tensile load is applied to chain links tend towards the straight configuration but the resilient elongate flexible member is deformed into an undulating or bent state and its resilient nature ensures that a reactive force is applied to the chain links. The tendency of the member to adopt a straight configuration when relaxed forces the chain to contract. The shape it may occupy is an approximate zig-zag configuration.

The resilient elongate flexible member may be removed before the chain is used in service or it may be retained, depending on the application.

It is thought that proof loading the chain in this manner improves performance of the chain in service. In particular, it is thought that it may improve the fatigue resistance and wear resistance of the chain.

The chain used in this proof loading method may have any of the components or features referred to above.

According to a third aspect of the present invention there is provided a power transmission device comprising a chain as defined above, whereby application of an input force in a direction transverse to the longitudinal axis of the chain is translated into a output force directed along the longitudinal axis of the chain by virtue of the chain moving towards the straight configuration.

There may be an output member attached to the chain at which the output force is transmitted. The output member may be attached to one end of the chain. The output member may be a linear actuator such as for example a piston and cylinder assembly.

According to a fourth aspect of the present invention there is provided a chain assembly comprising a plurality of chains, each according to the first aspect of the invention, each running between a first connection bracket and a second connection bracket, wherein the first and second connection brackets are movable relative to one another between a first position and a second position and are arranged to urge each of the chains towards the straight configuration when they are moved towards the second position.

Each of the plurality of chains may be different, or one or more of the plurality may be substantially identical to one another. Two or more of the chains may be positioned substantially parallel to one another when the first and second connection brackets are in the second position.

Each of said chains may define an articulation plane within which the links can pivot, and the plurality of chains may be positioned whereby their respective articulation planes are substantially parallel.

All of the plurality of the chains may be so positioned. For the avoidance of doubt, reference to planes being parallel is intended to include their being coplanar.

Alternatively, at least two of said chains may be positioned whereby their respective articulation planes are non-parallel.

All of the plurality of chains may be positioned such that none are parallel to each other.

The chain assembly may further comprise a damper sub-assembly configured to damp movement of the first and second connection brackets relative to one another.

The damper sub-assembly may be configured to damp movement of the connection brackets towards the first position and/or towards the second position. The damper sub-assembly may take any suitable form. For instance, it may be a dashpot, a piston pump, an electromagnetic damper, an elastomeric component which dissipates energy through hysteresis.

The damper sub-assembly may comprise an elongate piston extending between the first and second connection brackets, and at least one of the first and second connection brackets defines a fluid cavity within which the piston is slidably received, relative movement of the first and second connection brackets causing the piston to slide within the fluid cavity.

Both the first and second connection brackets may define fluid cavities within which the piston is slidably received.

The damper sub-assembly may comprise a deformable bladder which defines a fluid cavity therein, relative movement of the first and second connection brackets causing the bladder to change shape, thereby changing the shape of the fluid cavity.

The change of shape of the fluid cavity in the bladder may be a change in geometric shape (for instance a change in aspect ratio) and/or a change in volume.

The chain assembly may comprise a duct in fluid communication with the fluid cavity or cavities.

The duct may run through one or both of the connection brackets, or may be positioned in any other suitable location. For instance, where the chain assembly comprises a piston the duct may run through the piston.

The chain assembly may further comprise a resiliently deformable element configured to be deformed by relative movement of the first and second connection brackets.

The resiliently deformable element may be an elastomeric component such as a tube, sheet or block, or it may be a spring such as a coil spring, leaf spring or Belleville washer. Alternatively, it may take any other suitable form.

The resiliently deformable element is configured to be deformed by movement of the first and second connection brackets towards the first position.

Alternatively or in addition, the resiliently deformable element may be configured to be deformed by movement of the first and second connection brackets towards the second position.

The chain assembly may further comprise an alignment structure positioned to prevent at least two of the chains from contacting each other.

The alignment structure may be positioned to prevent all the plurality of chains from contacting each other.

BRIEF DESCRIPTION OF THE DRAWINGS

Specific embodiments of the present invention will now be described, by way of example only, with reference to the accompanying drawings in which:

FIG. 6 is a side view of a fifth embodiment of a length of chain in accordance with the present invention;

FIG. 7 is a plan view of part of the chain of FIG. 6;

FIG. 16 is a side view of the embodiment of FIG. 15;

FIG. 17 is a front view of the embodiment of FIG. 15;

DETAILED DESCRIPTION

Figure 1:
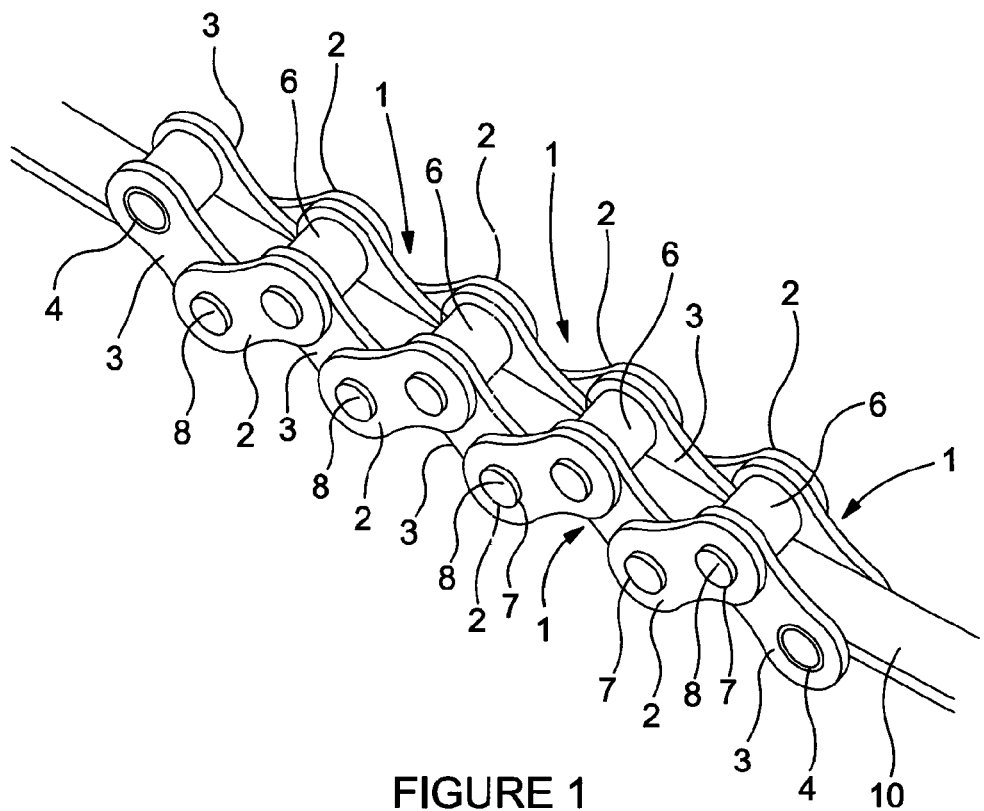
FIG. 1 is a perspective view of a first embodiment of a length of chain in accordance with the present invention.
Figure 2:
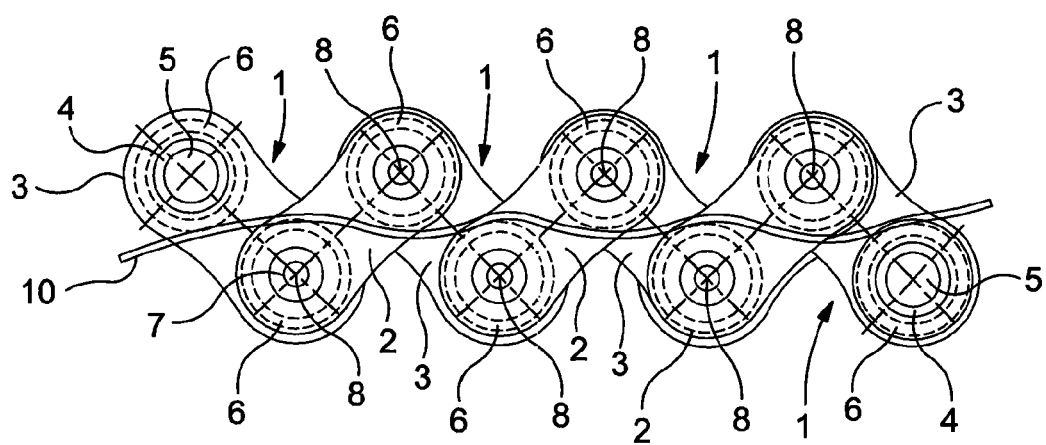
FIG. 2 is a side view of part of the chain of FIG. 1, with a small tensile load applied.

Referring now to FIGS. 1 and 2 of the drawings, the exemplary chain is a roller bush chain, although it is to be understood other chain types may be used in the present invention. The roller bush chain comprising a plurality of inner link assemblies 1 that are interconnected along the length of the chain by outer link plates 2 such that the inner link assemblies can articulate relative to each other.

Each inner link assembly 1 comprises a pair of opposed spaced inner link plates 3 connected together by a pair of bushes 4 (most of which are hidden in the figures) extending perpendicularly to the plates 3. Each of the inner link plates 3 has a pair of spaced apertures 5 in which the ends of the pair of bushes 4 are received. Each of the opposed inner link plates 3 is mounted in a friction or interference fit on the ends of the bushes 4 in a fixed relationship and a rotatable cylindrical roller 6 is supported on each bush 4 between the inner link plates 3.

The outer link plates 2 are of similar configuration to the inner link plates 3 but with smaller apertures 7 and are arranged to connect together adjacent inner link assemblies 1. A given outer link plate 2 overlaps with adjacent inner link assemblies 1 such that each of its apertures 7 is aligned with a corresponding aperture 5 in the inner link assembly 1 and is connected to the inner link assemblies 1 by pins 8 that pass through the aligned apertures 5, 7 and are received in the bushes 4. The apertures 5 in the inner link assemblies 1 are sized such that the assemblies are free to rotate on the pins 8 but the outer link plates 2 are fixed to the pins 8. More specifically, the apertures 7 in the outer link plates 2 are sized such that the edge of the plate around them is an interference or friction fit with the pins 8.

The chain further comprises an elongate flexible member 10 that is threaded through the inner link assemblies 1, along the length of the chain, in a sinuous formation. The elongate flexible member 10 is made of any suitable resilient material that is elastically deformable in a direction substantially perpendicular to its longitudinal axis in the manner shown in FIG. 2. It is able to move relative to the chain, although in order to prevent the elongate flexible member 10 working free of engagement with the chain it may be loosely connected to the chain at each end, or otherwise retain. For example suitable stop means may be provided at each end of the member.

In the embodiment shown the elongate flexible member 10 is threaded through the chain such that it alternately passes over and under successive rollers 6 of the chain. This can be seen most clearly in FIG. 2 in which the member is shown in solid line for clarity. The member 10 is designed such that in the undeformed state it tends towards a straight (linear) configuration (without undulations along its length). As a result the chain links 1, 2 are forced to adopt the position shown in the figures, i.e. the inner and outer link plates are not disposed in a linear alignment along the length of the chain but the inner link assemblies 1 are forced to articulate on the pins 8 to adopt the zig-zag configuration shown in which the link assemblies 1 are disposed at an oblique angle to the outer link plates 2. More specifically, in the orientation shown in the figures, the elongate flexible member 10 is woven through the chain such that it serves to push the rollers 6 alternately upwards and downwards with respect to the longitudinal axis of the chain. Thus the inner link assemblies 1 on each side of a pin 7 (which defines an articulation axis) are forced to move in opposite directions resulting in contraction of the chain length compared to when it is in a straight configuration.

In the configuration shown in FIG. 2, a small tensile load is applied between the chain ends such that the flexible member 10 is not in a straight configuration but is bent into a slightly undulating form.

The arrangement allows the chain to behave in the manner of a spring in that a load applied to the chain in a direction that tends to straighten the chain, such that the link plates 2, 3 are moved towards a straight (linear) configuration, is resisted by the elongate flexible member 10. As the load increases the chain is forced towards the straight configuration and the undulating form of the flexible member 10 increases thereby offering greater resistance to the load. The resistance operates in the manner of a spring force i.e. the force the member exerts on the chain links is proportional to its deflection. When the load has reached a magnitude such that the chain is pulled straight the flexible member 10 will not deflect any further and the load is carried through the chain links, thus providing a hard stop. A graph of load plotted against deflection would show a curve that is initially steep but which flattens out. In some embodiments the flexible member may be compressed by the chain links in a direction transverse to its length such that its thickness is reduced.

In the event that the chain is overloaded in tension the link plates 2, 3 articulate towards a position where the chain is straight and reach the hard stop position referred to above.

The elongate, flexible, resilient member 10 may be made from any suitable flexible material such as for example, a polymer, steel, a synthetic or natural fibrous material, or a composite material. It is resilient such that it springs back to its original linear form once the load is removed. The chain is thus designed such that elongate flexible member has sufficient stiffness to force the chain links to articulate and to resist straightening of the chain links. The member may be rectangular or any other shape that would conveniently pass along the length of the chain in the manner described above. As can be seen from the figures the strip may have substantially planar upper and lower surfaces. The member may be a unitary, continuous piece or it may be discontinuous i.e. it may comprise a plurality of pieces placed at different locations along the length of the chain. In the latter instance the pieces may be disposed at selected strategic locations so as to provide a variable stiffness characteristic along the chain length.

The elongate flexible member may be provided by a plurality of elongate elements arranged alongside one another and each passing along the chain length (although one or more may be discontinuous). For example, a plurality of strips or wires of steel, spring steel or any other suitable elastic material may extend in parallel along the length of the chain (or part of the chain length). The thickness and/or width of the elongate flexible member may vary along its length to afford different stiffness characteristics, depending on the load. For example, this may arranged along the chain to behave such that some links deflect (acting against the flexible member) more easily than others, thereby providing variable stiffness along the chain length. The thicker the member, the greater the spring constant and therefore the stiffer the spring effect.

Figure 13:
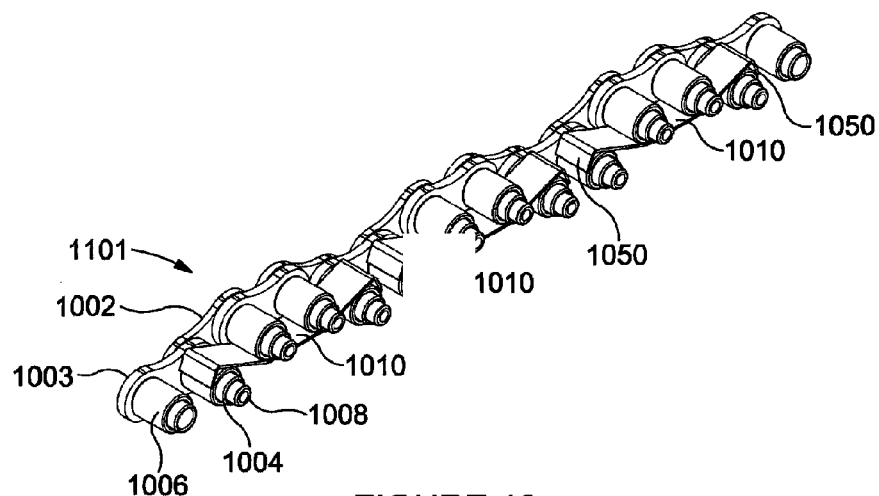
FIG. 13 is a perspective view from the side of a seventh embodiment of a length of chain in accordance with the present invention.
Figure 14:
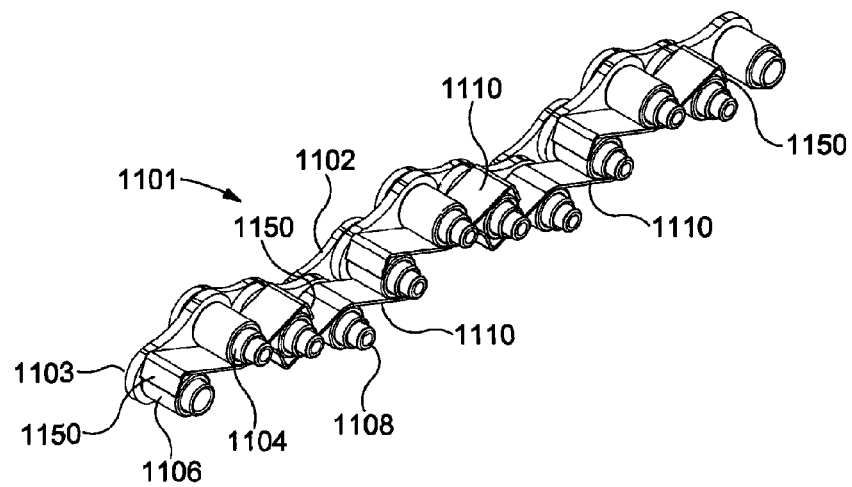
FIG. 14 is a perspective view from the side of an eighth embodiment of a length of chain in accordance with the present invention.

Examples of a chain in which the elongate flexible member is discontinuous are shown in FIGS. 13 and 14, in which the outer link plates 1002, 1102 have been removed on one side of the chain 1001, 1101 so as to provide clarity. In each embodiment the elongate flexible member 1010, 1110 comprises separate sections of spring steel plate (although any suitable material or form may be used as described above). The plates each have hooked ends 1050, 1150 so as to prevent them from becoming dislodged from the chain. The hooked ends may optionally be received in corresponding slots (not shown) formed in the rollers 1006 (in the absence of rollers the slots may be formed in the bushes 1004 and in the absence of bushes the slots may be formed in the pins 1008). As the articulation occurs the rollers 1006 would rotate to pay out slack. In the embodiment of FIG. 13, the plates pass under adjacent rollers 1006 of a single inner link assembly and over a single roller 1006 of the next link assemblies at each end. In FIG. 14, the plates pass under a single roller 1106 and then over each of the adjacent rollers 1106 on each side of the first. It will be appreciated that the same arrangement could be used on a chain without rollers (in which case the plates would contact the bushes) or on a chain without rollers and bushes (in which case the plates would contact the pins or other articulation elements).

The invention may have application to the proof loading of a chain after manufacture. Chains are generally proof loaded after their assembly and before supply to customers in order to improve their performance in service. More specifically, the chain is subjected to a tensile load by specifically designed equipment, the load magnitude approximating the maximum load of the chain in service. This is typically a selected percentage (e.g. 30%) of the breaking load of the chain. The chain is stretched straight and this serves to align the various chain components and impart an initial elongation.

The elongate flexible member 10 may be threaded through the chain, as described above, after its assembly but before proof loading. This serves to contract the chain length by forcing it into the zig-zag configuration shown in the figures. Thus the proof loading procedure can be performed with a shorter chain in a more restricted space. Moreover, the direction of the forces applied to the chain by the elongate flexible member during proof loading are similar to those that a chain encounters as it engages with a drive sprocket (where the load is generally at a maximum) in that the variation in the angle of the load between adjacent links is similar. It is thought that proof loading the chain with the elongate flexible member 10 present potentially imparts beneficial conditioning of the chain components resulting in improved fatigue performance of the chain in use. The elongate flexible member 10 used in the proof loading process would typically be removed before the chain is used in normal service. Moreover, the member used in the proof loading process may be stiffer than a member that forms part of the chain in use as described above.

In the embodiment of FIGS. 1 and 2 the chain will inherently have damping owing to losses in energy that occur as a result of the elongate flexible element 10 sliding over the rollers 6 as the chain flexes. The damping characteristics could be improved if the resilient elongate flexible member 10 is manufactured wholly or partly from a suitable polymeric damping material. In one example the entire member 10 is made from a polymeric damping material having suitable characteristics to provide the required damping whilst also having the capacity to carry the load applied to the chain. One example is an injection mouldable polymer such as, for example, a thermoplastic polyester elastomer. A commercially available product of this kind is available from Dupont under the trade mark Hytel®. As an alternative, the resilient elongate flexible member 10 may comprise a core of suitable material such as spring steel (or any of the materials referred to above in relation to FIGS. 1 and 2) to which a suitable elastomeric polymer coating is applied (e.g. a nitrile rubber or other synthetic rubber copolymer).

In a further alternative, one or more moving parts of the chain (the pins 8, bushes 4 and rollers 6) may be coated with damping grease manufactured from a viscous synthetic oil so as to provide a high shear resistance. When such damping greases are applied between surfaces that would otherwise come into contact with one another it requires a significant force to move those surfaces towards each other. The amount of force required and therefore the amount of the damping effect can be controlled by suitable selection of the base oils used in the grease. The higher the molecular weight of the oil the greater the internal shear resistance of the grease. The damping grease may also have the effect of reducing the noise of the chain in use. Such a product is commercially available from Nye Lubricants Inc. of Fairhaven, Mass., USA. It is thought that a such a damping grease having a base kinematic viscosity (at 25° C.) of around 50,000 cSt (0.05 m$^2$/s) would be appropriate.

Figure 3:
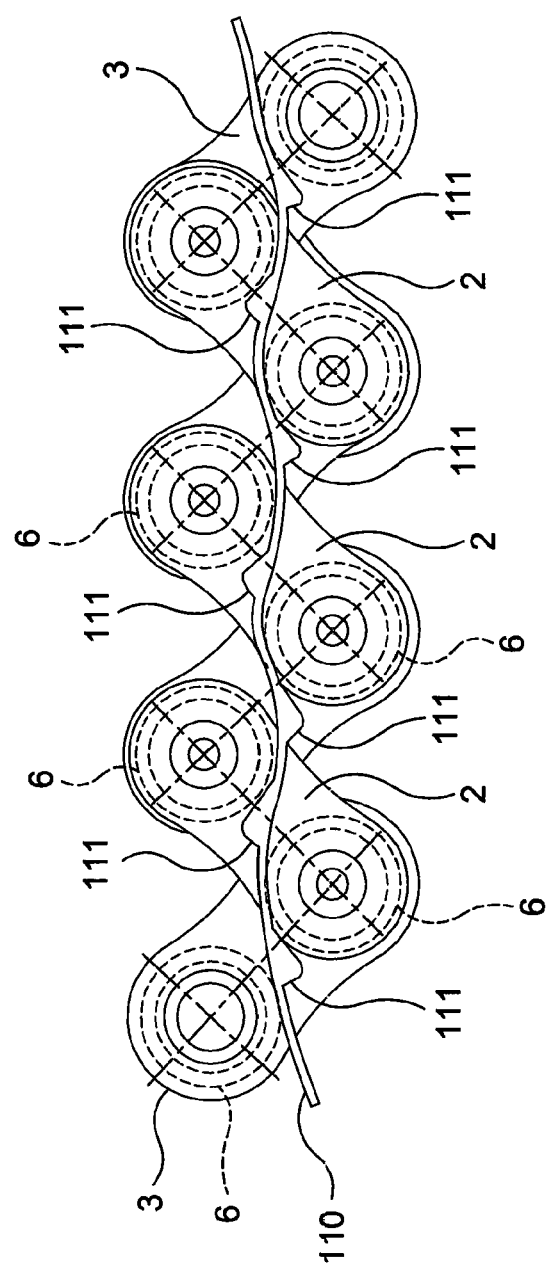
FIG. 3 is a side view of a second embodiment of a length of chain in accordance with the present invention.

FIG. 3 illustrates a modification to the chain of FIGS. 1 and 2 that is designed to afford improved damping characteristics. In the embodiment of FIG. 3 the inner link assemblies 1 and outer link plates 2 are unchanged from those of FIG. 1 and are therefore given the same reference numbers. The only difference is in the design of the elongate flexible member 110, which is an elastomeric polymer coating (such as, for example, a nitrile rubber) that is bonded to a core material (for example a metal such as steel). The coating defines a plurality of protuberances 111 spaced along the length of the chain on opposite sides of the member 110 and are designed to coincide with the regions where the member 110 progressively comes into contact with the rollers 6 as the chain is under a tensile load. The protuberances 111 are each designed to be small enough to allow the elongate flexible member 110 to be threaded along the assembled chain. In an alternative embodiment the member 110 may be made from a suitably stiff elastomeric polymer without the need for a core. As the chain is straightened under tensile load the rollers 6 bear against the protuberances 111 and tend to compress them, thus producing a damping effect. The size and shape of each protuberance 111 may be configured to produce the desired damping characteristic. This may be designed to vary along the length of the chain. Moreover, the spacing of the protuberances may vary slightly along the length of the chain in order to determine the damping characteristics. For example, a first protuberance may be disposed immediately adjacent to a roller 6 and the next may be disposed slightly further away from its respective roller thereby providing for progressive damping and the load increases. In some embodiments one or more protuberances 111 may be omitted from the sequence along the chain length.

In the embodiment of FIG. 3, the chain is damped in one direction and not the other. That is, if the chain is fixed at one end and loaded at the other the damping effect will only be effective in one orientation.

Figure 4:
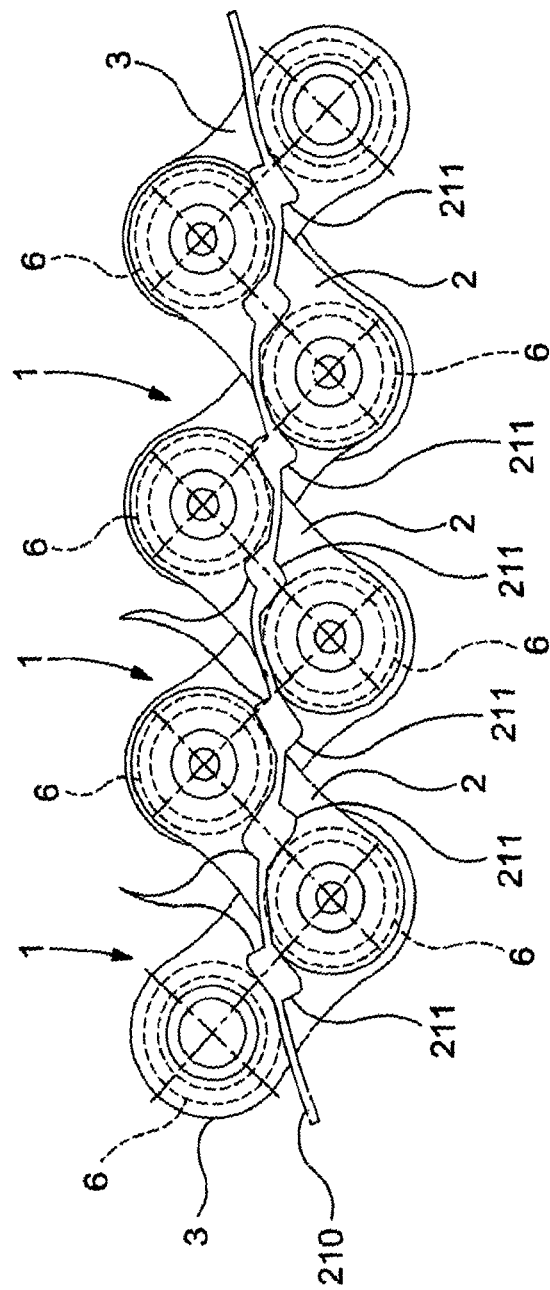
FIG. 4 is a side view of a third embodiment of a length of chain in accordance with the present invention.

The chain of FIG. 4 corresponds to that of FIG. 3, except that the resilient elongate flexible member 210 has been modified slightly to allow for damping in both directions. In particular the protuberances 211 are provided along the length of the chain on both sides of the member 210 and on both sides of a given roller 6, such that the roller contacts the member between adjacent protuberances 211 and encounters a protuberance 211 regardless of the direction of movement of the roller 6 relative to the member 210. All of the design variations described above in relation to the chain of FIG. 3 apply equally to this embodiment.

Figure 5:
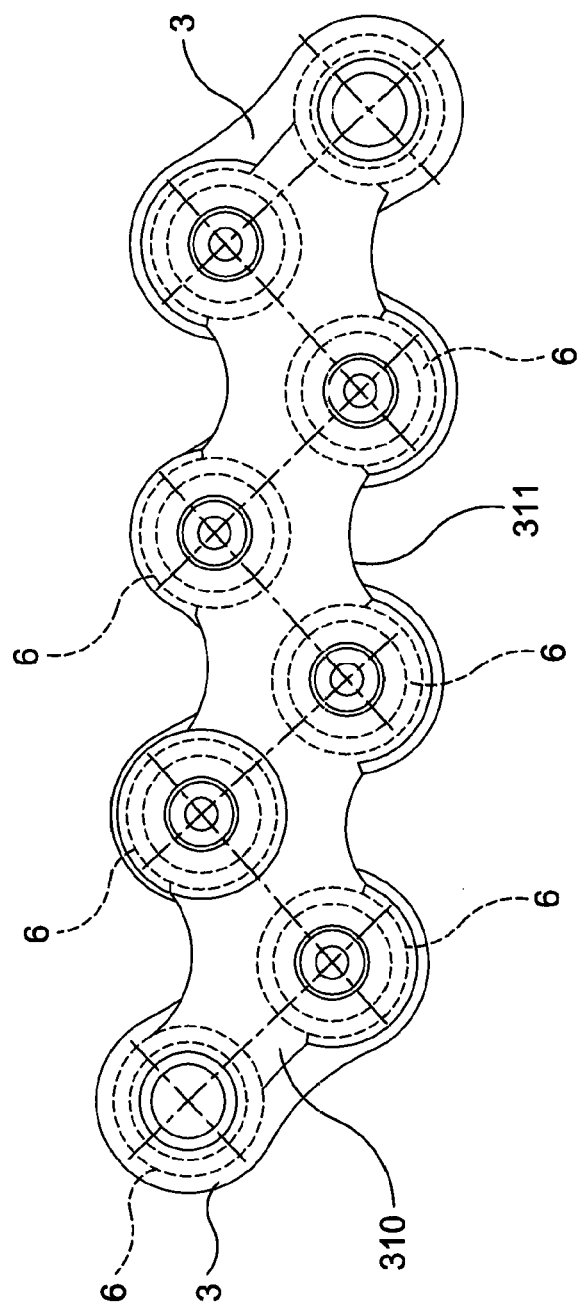
FIG. 5 is a side view of a fourth embodiment of a length of chain in accordance with the present invention.

In the embodiment of FIG. 5, the outer link plates on the side of the chain nearest the viewer have been removed for clarity. In this embodiment the resilient elongate flexible member 311 is threaded between the link assemblies 1 such that it fills the void defined between the rollers 6. In this instance the member is formed or inserted during assembly of the chain. The member 311 may be wholly or partly made from a suitable polymeric elastomer and may or may not be bonded to the exterior surface of the chain rollers 6. For example, the member may comprise a polymeric elastomer that is injected into the void between links such that it bonds to the rollers 6 at least. However, it is to be understood that the member need not be bonded in order for it to be effective. The resilient elongate flexible member 311 may have a core member such as, for example, an elongate steel plate or strip. This may be inserted in place during the assembly operation before a polymeric elastomer is injection moulded into the void between links and around the core member.

It is to be appreciated that the elongate flexible member may be used on other types of chains such as, for example, chain without rollers or bushes, a chain comprising link plates and pins only such as a leaf chain (e.g. a fork lift truck chain) or a Galle chain (in which the pins are enlarged compared to those depicted in the figures). In some instances where there are multiple strands of link plates arranged in parallel along the width of the chain, selected link plates may be removed from the chain to accommodate the elongate flexible member. Moreover, the inner link assembly may take any suitable form including moulded from a plastics material.

The elongate flexible member is simply threaded around the articulation axes of the chain such that it acts in opposite directions on adjacent articulating link assemblies so as to force them to a contracted position. It is to be understood that the member may be threaded in such a manner that it misses one or more links.

Figure 12:
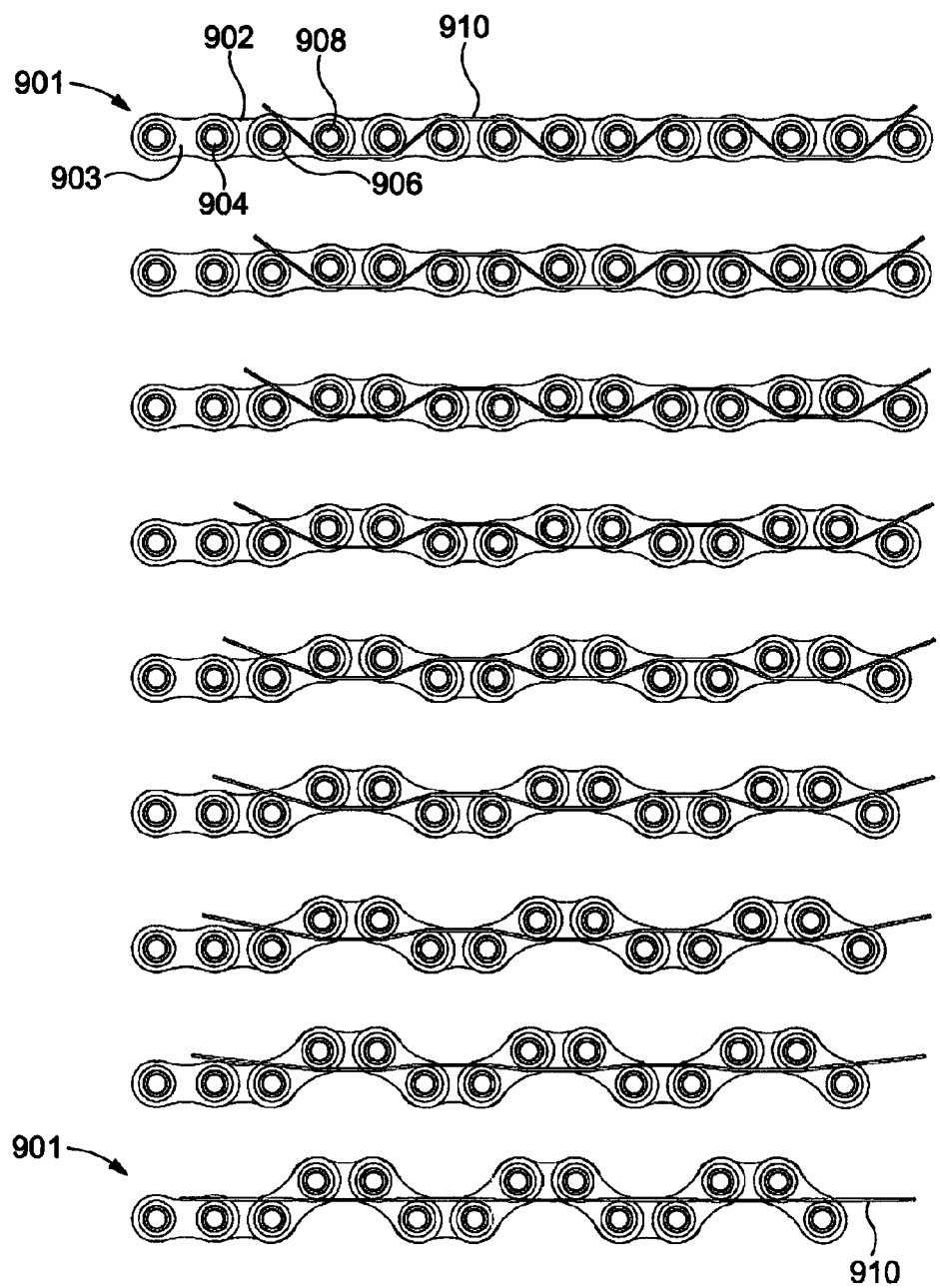
FIG. 12 is a side view of a sixth embodiment of a length of chain in accordance with the present invention, the chain being shown with the outer link plates on one side removed for clarity and being shown in different stages between a configuration in which the chain is straight and the elongate flexible member deformed and a configuration in which the chain has articulated to a contracted configuration and the elongate flexible member is straight.

The same effect may be achieved by threading the elongate flexible member in the manner depicted in FIG. 12. In this embodiment the member 910 passes underneath two successive pins 908 (in this instance belonging to separate link assemblies) before passing between adjacent pins to the opposite side where it passes over the next two successive pins. It is thus threaded between the articulation elements in alternate directions so as to force the adjacent links 903 to articulate out of the straight configuration as can be seen by comparing the separate images of the chain down the page. Moving down the page, the chain is initially under full tension such that it adopts a linear configuration, in which the elongate flexible member is at its most deformed position and then progressively moves to the fully contracted configuration shown at the bottom of the page in which the elongate member 910 has resorted to the straight configuration (i.e. the tension is fully relaxed).

The elongate flexible member of any of the embodiments described herein may occupy any suitable location over the width of the chain. For example in FIGS. 1 and 2 at least the member is shown as having a longitudinal axis that substantially coincides with the central longitudinal axis of the chain. In other embodiments the strip may be offset from the axis of the chain, either between the inner links or outside thereof, such as in the embodiment of FIGS. 6 and 7.

The chain of FIGS. 6 and 7 is a leaf chain with interleaved inner and outer link plates 402, 403. The pins 408 extend beyond the outer link plates 402 on each side and support outboard rollers 415. An elongate flexible member 410 of the kind described above is threaded around the outboard rollers 415 on one or both sides, rather than around the link plates. The function of the elongate flexible member 410 is the same as in the preceding embodiments in that it serves to force the links of the chain to articulate about the pins out of the straight configuration and into the zig-zag configuration shown in FIG. 6. In the orientation shown in the figures, the elongate flexible member 410 is woven between the outboard rollers 415 of the chain such that it serves to push the outboard rollers alternately upwards and downwards with respect to the longitudinal axis of the chain. Thus the inner link plates 403 on each side of the pin (which defines an articulation axis) are forced to move in opposite directions to the outer link plates 402 resulting in contraction of the chain length compared to when it is in a straight configuration. The elongate flexible member 410 may take any one of the forms discussed in the preceding paragraphs. The outboard rollers 415 each have a peripheral flange 416 that prevents the elongate flexible member from becoming laterally displaced and falling out of the chain. The flange 416 may be replaced by any other suitable means for lateral retention of the elongate flexible member such as, for example, a separate washer located on the end of the pin.

It is to be appreciated that the chain of FIGS. 6 and 7 may be of any suitable type such as, for example, a conventional roller bush chain fitted with outboard rollers.

Figure 8:
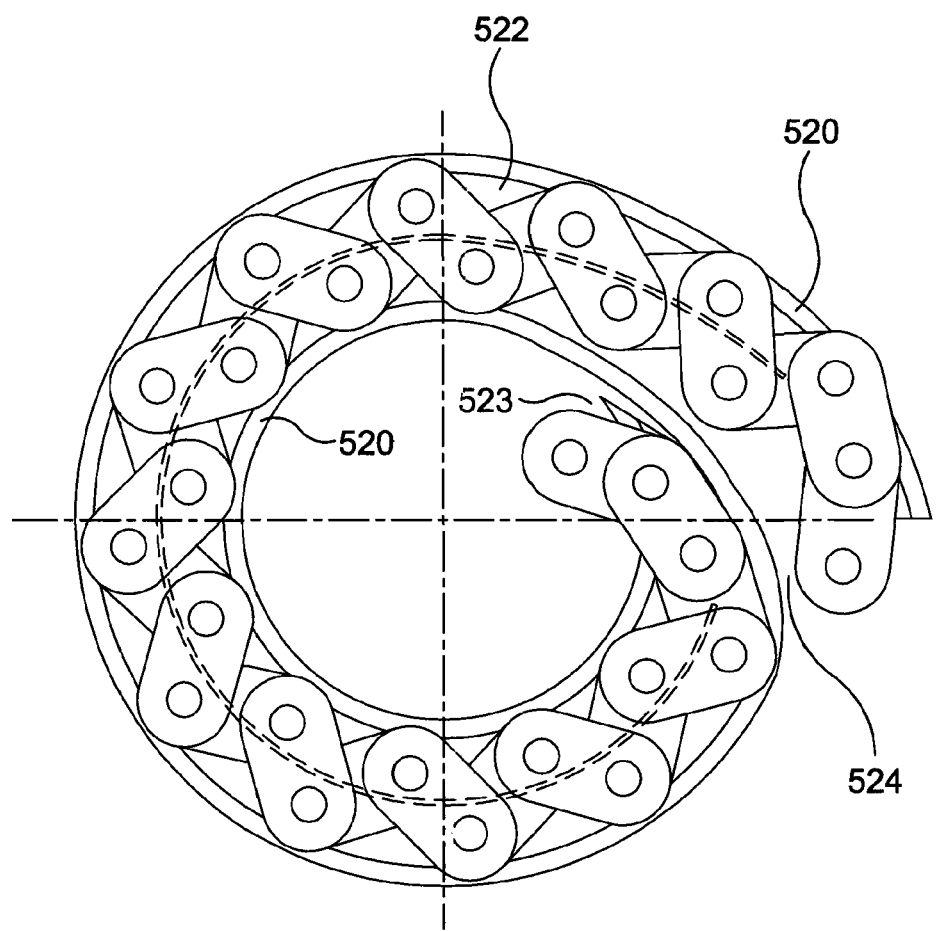
FIG. 8 is a side view of the chain of FIGS. 1 and 2 shown arranged in a spiral configuration within a guide rail.

The chain of any preceding embodiment may be stored in a spiral configuration in a volume defined by a housing. An example is shown in FIG. 8 in which the chain is stored in its relaxed configuration (i.e. not under load) in a space defined by a spiral rail 520. The rail defines a spiral shaped volume 522 in which the chain is stored, a first open end 523 at which the chain is fixed to a suitable anchor point which is separate from the rail 520, and a second open end 524 from which the chain extends in use. When a load is connected to the chain at the second end 524 it is pulled to an extended configuration in which it extends beyond the rail and deforms the elongate flexible member in the manner described above. The movement of the chain between the relaxed and extended positions is guided by the rail 520. This configuration provides for a very compact arrangement that may be applied, for example, to balanced roller shutter doors or the like.

It will be appreciated that the housing may take any suitable form that defines a spiral volume for the chain. In one embodiment the spiral volume is defined by a pair of guide rails.

The chain of FIG. 8 is able to accommodate higher loads in comparison to other springs, such as, for example, a coil spring and allows the load to be moved over a curved surface, which is often impractical when using other springs such as, for example, a coil spring.

Figure 9:
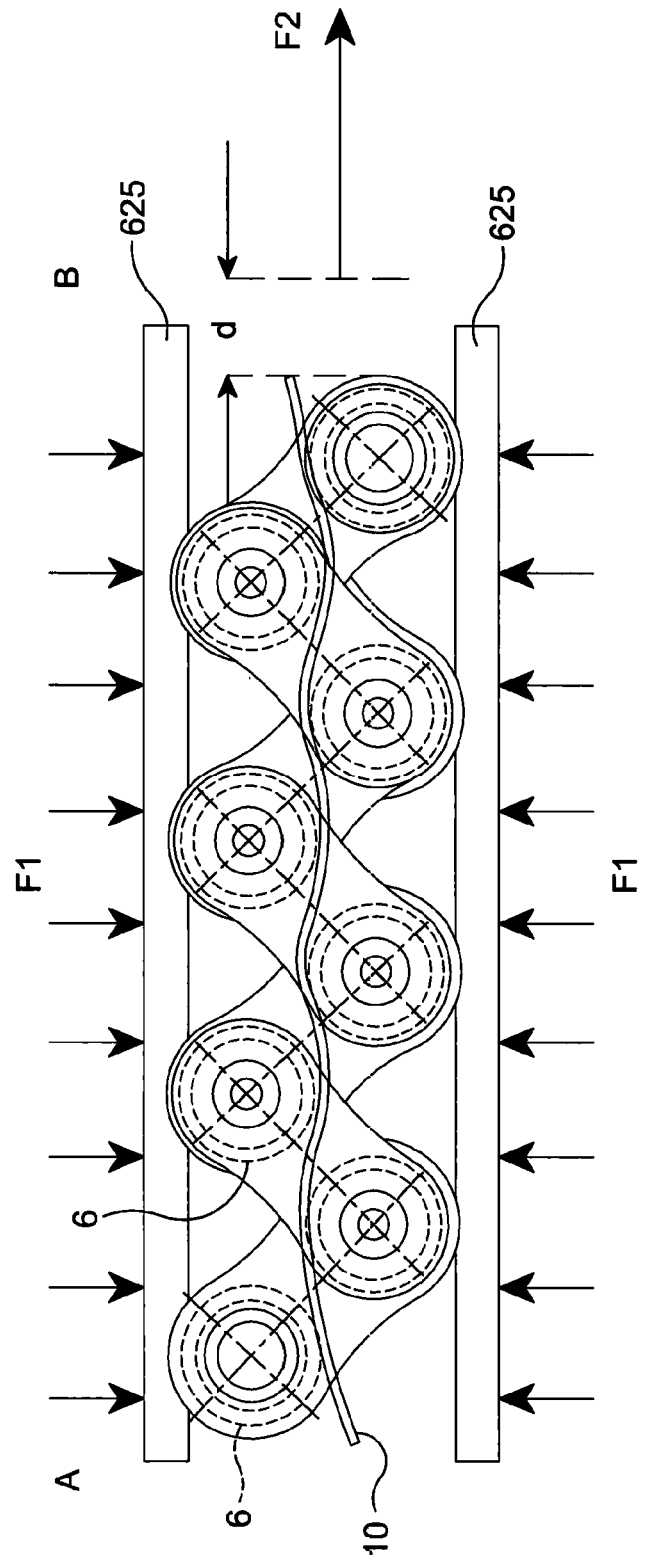
FIG. 9 is a side view of the chain of FIGS. 1 and 2 disposed between two rectilinear guide rails.

In FIG. 9, the chain of FIGS. 1 and 2 is disposed between two rectilinear guide plates 625. It will be appreciated that any of the chain embodiments described above may be disposed between the plates in this manner. The chain rollers 6 bear against the surfaces of the opposed guide plates 625. A force F1 applied in a direction that moves the guide plates 625 towards each other serves to compress the chain towards the rectilinear form and, as a consequence, to deform the elongate flexible member 10. As described in the preceding embodiments the elongate flexible member 10 tends to resist deformation and the chain acts in the manner of a spring. One the force F1 is removed the chain is free to relax and the guide plates 625 are forced away from each other by the spring force.

In one embodiment a first end A of the chain is fixed to a separate anchor point (not shown) and the opposite second end B is free to move relative to the guide plates 625. In such an arrangement the application of force F1 induces a lateral movement (i.e. perpendicular to the direction of force F1) of the chain as it extends. End B of the chain moves by a distance d and applies a laterally directed force F2 to an attachment (not shown). The attachment may take any suitable form. For example, it may be part of a position sensor, a switch, a mechanical linkage, or an electromagnet. In other embodiments it may be a pneumatic or hydraulic ram. It will be appreciated that the attachment may include any suitable means for converting the work done by the movement of force F2 into a useful energy form. A damper may be applied between the second end B of the chain and the load in order to reduce any vibration.

It will be appreciated that the guide plates 625 may be replaced by any suitable guide member. For example one of the guide members may simply be a stationary member of a machine component or may be provided by a fixed support including the ground.

Figure 10:
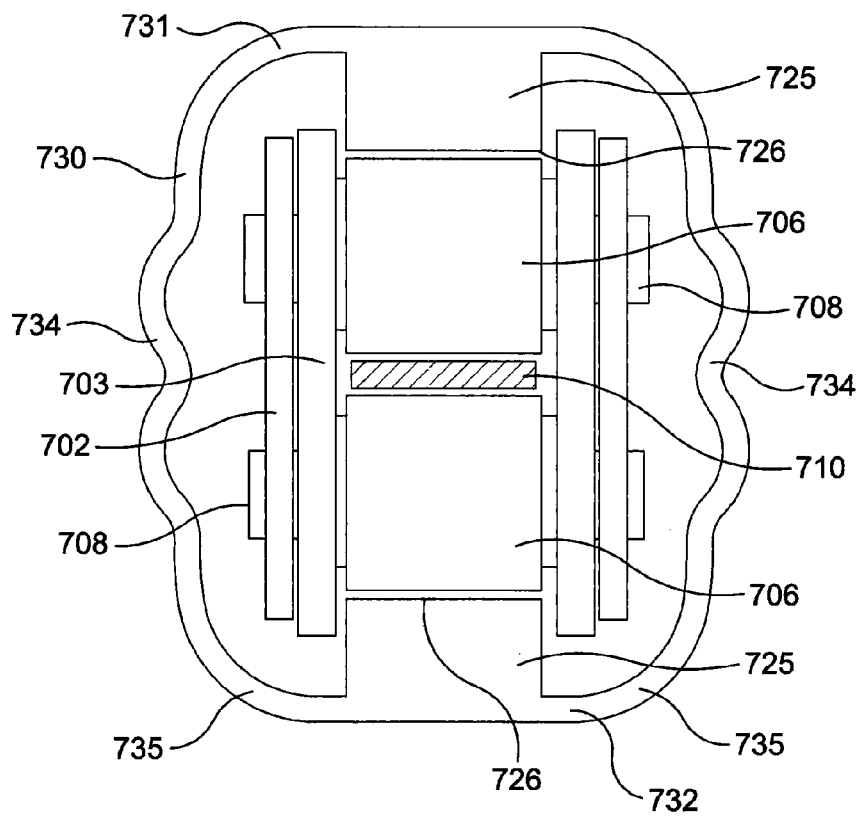
FIG. 10 is a sectioned view illustrating the chain of FIGS. 1 and 2 disposed in a deformable casing, the plane of the section being perpendicular to the longitudinal direction of the chain.

FIG. 10 illustrates the same principle as that shown in FIG. 9 but with the chain disposed in a casing 730 arranged for compression. The casing may take any suitable form (such as, for example, circular or rectangular in cross-section) but in the embodiment shown it has upper and lower walls 731, 732 with substantially planar external surfaces and opposed side walls that having undulating central portions 734 and arcuate outer portions 735. The side walls are elastically deformable (e.g. flexible, collapsible or compressible) when placed under compressive load in a direction generally along their length. Thus the side walls are designed to permit the upper and lower walls 731, 732 to be displaceable towards or away from each other. In this particular embodiment the movement is afforded by the undulating form of the side walls that allows them to flex. The interior surface of the upper and lower walls 731, 732 each have a protrusion 725 that defines a planar abutment surface 726 for contact with the chain rollers 706. It will be appreciated that the abutment surface 726 may take any suitable form provided it allows the rollers 706 to rotate.

In the same manner as the arrangement of FIG. 9, the chain rollers 706 bear against the abutment surfaces 726 that act as guides. When a compressive force is applied to the casing in a direction that moves the upper and lower walls 731,732 together, the side walls deform to accommodate this movement and the chain is compressed between the abutment surfaces 726 of the protrusions 725. As before this serves to move the chain towards the rectilinear form and, as a consequence, the elongate flexible member 710 is deformed and applies a resistive force in the manner of a spring. Once the compressive force is removed the chain is free to relax and the abutment surfaces are forced away from each other by the spring force such that the casing 730 returns to its original shape. The casing may be open at one or both ends or may simply provide sufficient clearance at each end to accommodate the extension of the chain.

It is to be appreciated that the side walls may be deformable only along part of the length of the casing, which may encompass all or part of the chain length. It is also to be understood that the chain of FIG. 10 may conform to any the chain embodiments described above.

Figure 11:
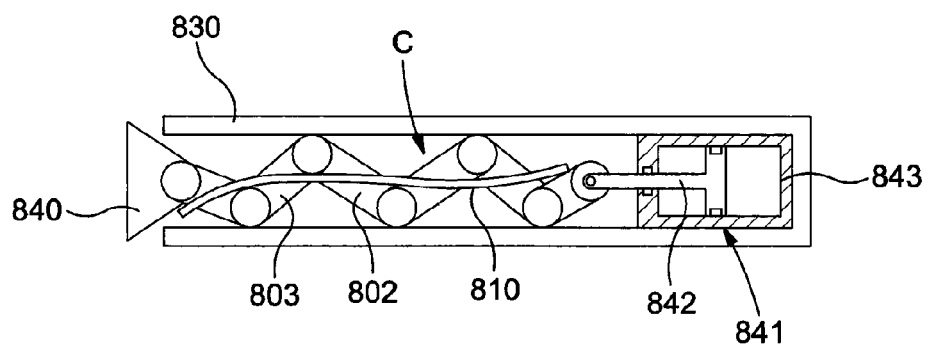
FIG. 11 is a schematic side view of the chain of FIGS. 1 and 2 shown in a casing.

In the embodiment of FIG. 11, the chain is disposed within a deformable housing 830. One end of the chain C is fixed to an anchor point 840 spaced from the housing 830, and the other end is connected to a damper 841. In this particular embodiment the damper is shown schematically as a sealed dashpot i.e. a piston 842 that is slidable within a cylinder 843 that contains hydraulic or pneumatic fluid. The housing 830 is deformable in the vertical direction in the region around the chain C in the same manner as discussed in relation to the FIG. 10 embodiment. This arrangement would serve to damp the movement of the chain as it is extended and then as it retracts (under the influence of the elongate flexible member 810). The vertically directed force applied to the housing 830 is translated into horizontal movement of the end of the chain and the piston 842 and this could be exploited in power transmission applications. For example the piston, may be adapted to extend out of the housing to where it is attached to a suitable mechanical linkage or to means for converting the work done by the piston into useful energy. For example, an electromagnet may be used to generate electricity that may be stored in a battery or otherwise exploited. The housing may provide a sealed storage location for the battery and/or associated electrical circuits. Alternatively a piezoelectric device may be used to generate electricity from the movement or vibration of the chain or any of its components or a component attached to the chain.

The damper may be replaced by other kinds of dampers such as an air compressor or a means for converting mechanical to electrical power.

In a further embodiment the elongate flexible member in any of the aforementioned embodiments may have piezoelectric properties such that any deformation is converted into an electrical charge. It may be made from any material that generates an electrical charge on deformation.

Figure 15:
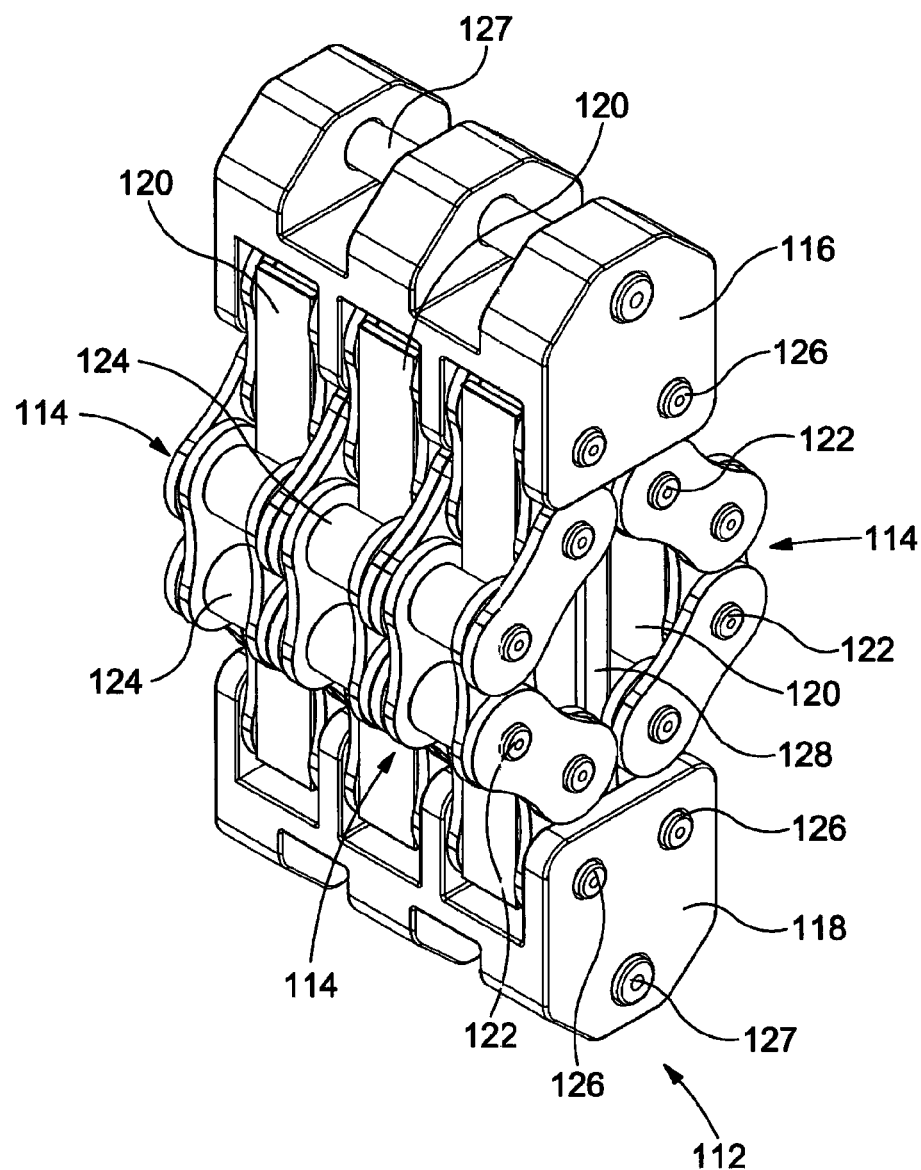
FIG. 15 is a perspective view of an embodiment of a chain assembly in accordance with the present invention.

In some applications it may be desirable to utilise a chain according to the invention, but the required resistance to extension may be beyond what can practically be achieved with a single chain. In such circumstances a chain assembly may be utilised. FIGS. 15-17 show an embodiment of a chain assembly 112 according to the invention. The chain assembly 112 has six chains 114 each of which is connected at one end to a first connection bracket 116 and at the other end to a second connection bracket 118. In this embodiment the first and second connection brackets 116, 118 are substantially identical.

FIGS. 15-17 show the chain assembly 112 with the connection brackets 116, 118 in a first position. The connection brackets 116, 118 are movable to a second position, in this case by moving them directly apart from one another. Moving the connection brackets 116, 118 towards the second position urges each chain 114 towards the straight configuration. As described previously, the chains 114 resist being stretched towards the straight configuration. They therefore act to urge the connection brackets 116, 118 back towards the first position when moved therefrom. Since moving the connection brackets 116, 118 towards the second position stretches six chains 114 in parallel, the resistance to extension provided by the chain assembly 112 is six times that of a single chain 114. Other embodiments may have any number of chains 114 from 2 upwards, allowing the resistance to extension to be tailored to a specific application.

In this embodiment, the chains 114 are all substantially identical. More particularly, each chain 114 is of the type shown in FIG. 12, with the elongate flexible member 120 passing over and under successive pairs of pins 122 and rollers 124. The chains 114 are connected to the connection brackets 116, 118 by rivets 126, about which the adjacent link plates (i.e. the distal link plates of the chains 114) can rotate. Each connection bracket 116, 118 also has a rivet 127 which provides a mounting point for attaching other components to the assembly 112 or for attaching the assembly to a machine or apparatus.

The chains 114 are arranged in two rows of three, with an alignment structure 128 positioned between the rows. The alignment structure 128 is loosely received within recesses 130 in the connection brackets 116, 118, so that it is able to move to a certain extent within them. The alignment structure 128 being positioned between the two rows of chains 114 acts to prevent any of the chains from coming into contact with each other, which could significantly increase wear and reduce service life of the assembly 112. In this embodiment the chains 114 are positioned such that they run substantially parallel to one another when in the straight configuration. However, in other embodiments this may not be the case.

Each chain 114 of the chain assembly 112 is a roller bush chain, as described previously. As such, each chain 114 defines an articulation plane within which its links can articulate about their respective pins 122. The articulation plane of each chain 114 is substantially perpendicular to its pins 122. In this embodiment, the chains 114 are positioned so that their articulation planes are parallel. As such, the entire chain assembly 112 can articulate within a plane that is parallel to the articulation planes of the chains 114, in a manner akin to a single chain. The articulation of the chain assembly 112 is limited, however, by the alignment structure 128. The loose fit of the alignment structure 128 in the recesses 130 permits movement to a certain extent, beyond which the alignment structure will brace against the walls of the recesses 30 and prevent any further articulation.

Figure 18:
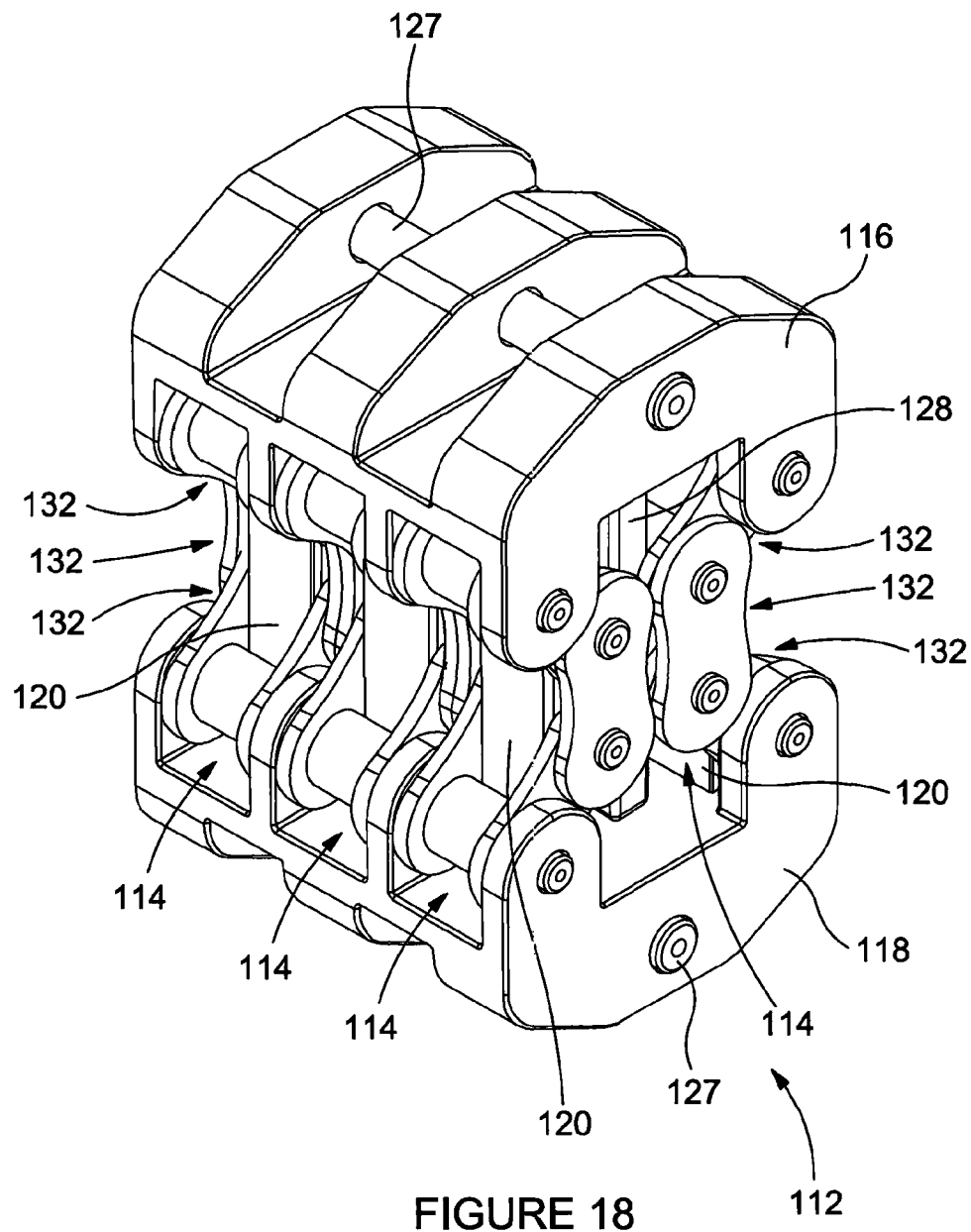
FIG. 18 is a perspective view of a modification of the embodiment of FIG. 15.

FIG. 18 shows a modification of the embodiment of FIGS. 15-17. In this arrangement, the chains 14 are of reduced length, each having only three pairs 132 of link plates (as opposed to five in the above embodiment). In addition, though in the embodiment of FIGS. 15-17 the resilient elongate flexible member 120 of each chain 114 is positioned so that it urges the central portion of that chain outwards, in this arrangement it is positioned to urge the central portion of the chain inwards. As such, the overall size of the chain assembly 112 is reduced, allowing it to be used in smaller spaces.

Figure 19:
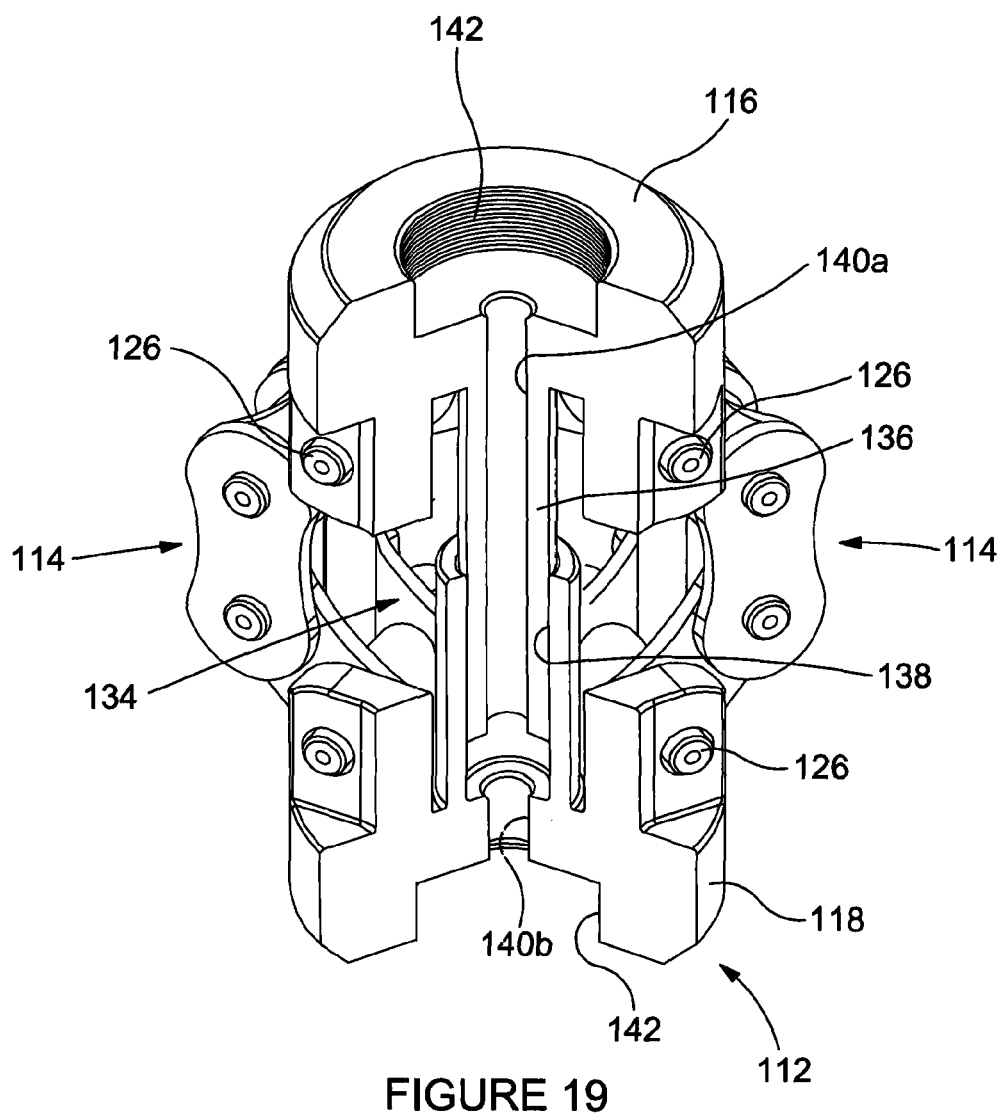
FIG. 19 is a perspective cutaway view of another embodiment of a chain assembly.

FIG. 19 shows a second embodiment of a chain assembly according to the invention. Again, it has a first connection bracket 116 and a second connection bracket 118 connected by a plurality of chains 114 and movable between said first position (as shown in FIG. 19) and said second position. In this case however, there are three chains 114 (two of which are visible in FIG. 19), and each chain is positioned so that its articulation plane is non-parallel to the articulation planes of each of the other chains. More particularly, the chains 114 are positioned substantially circumferentially around the longitudinal axis of the assembly 112, and are evenly spaced so that each chain 114 is positioned with its articulation plane at an angle of 60 degrees with the articulation planes of the other two chains. At least two of the chains 114 (in this case all of the chains) being arranged with non-parallel articulation planes may provide the chain assembly 112 with increased torsional and/or lateral rigidity in comparison with arrangements where all the chains 114 are positioned so that their articulation planes are parallel. In other words, the chain assembly of this embodiment has increased resistance to torsional forces applied (for instance between the connection brackets 116, 118) about its longitudinal axis in comparison to the embodiment of FIGS. 15-17. In addition, because the articulation planes of the chains 114 are non-parallel the chain assembly of this embodiment has increased resistance to bending along its longitudinal axis.

The chain assembly 112 of this embodiment also comprises a damper sub-assembly 134 which provides additional damping to that supplied by the chains (as described previously). The damper sub-assembly 134 comprises a piston 136 comprised within the first connection bracket 116, which is slidably received in a fluid cavity 138 provided in the second connection bracket 118. Sealing elements may be provided between the piston 136 and fluid cavity 138, though these are not shown in FIG. 19. As the connection brackets 116, 118 move between the first and second positions, the piston slides within the fluid cavity 138, changing the volume thereof. The piston 136 of the first connection bracket 116 being received within the fluid cavity 138 of the second connection bracket 118 also provides additional structural support to the chain assembly 112.

In this embodiment the fluid cavity 138 is connected to a duct 140a in the first connection bracket 116 (the duct in this case running through the piston 136) and connected to a duct 140b in the second connection bracket 118. In this embodiment the fluid cavity 138 is filled with damping fluid in the form of grease, and the ducts 140a, 140b are each connected to a bulk source of this grease. The piston 136 and fluid cavity 138 cooperatively form a piston pump mechanism. Movement of the piston 136 deeper into the fluid cavity 138 (i.e. when the connection brackets 116, 118 move towards the first position) forces grease out of the cavity 138 and into the bulk source (not shown) through one or both of the ducts 140a, 140b. Similarly, the piston being moved outwards from within the fluid cavity 138 (i.e. when the connection brackets 116, 118 move towards the second position) sucks grease into the cavity 138 through one or both of the ducts 140a, 140b. In other embodiments, the fluid cavity 138 may enclose a sealed volume of gas, allowing the piston 136 and fluid cavity 140 to function as an air damper.

The embodiment of FIG. 19 also differs from that of FIGS. 15-17 in that the connection brackets 116, 118 have threaded ports 142 rather than rivets (127 in FIGS. 15-17) for attaching the assembly 112 to other components or to a machine or apparatus.

Figure 20:
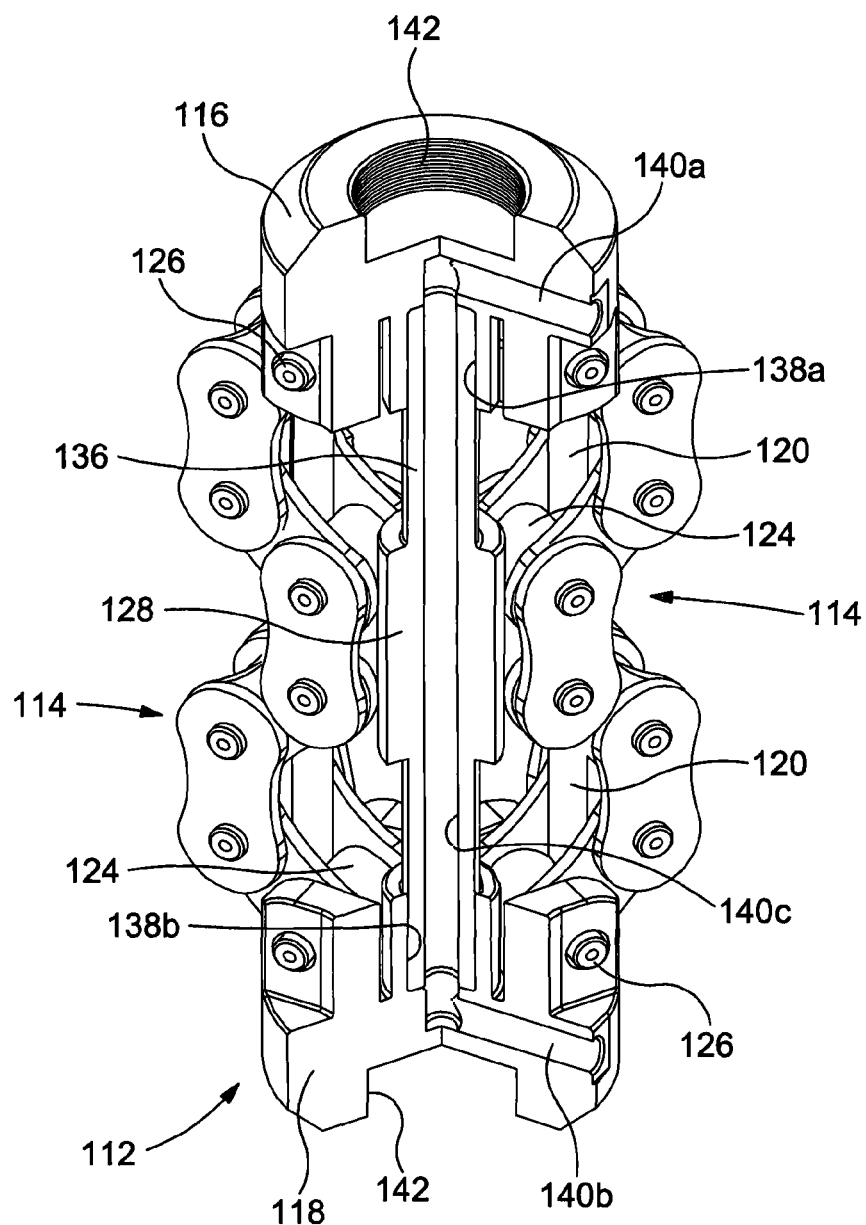
FIG. 20 is a perspective cutaway view of a modification of the embodiment of FIG. 19.

FIG. 20 shows a modification of the embodiment of FIG. 19. In this case the piston 136 is not part of either connection bracket 116, 118, but is slidably received in fluid cavities 138a, 138b in each of them. As in the embodiment of FIG. 19 each connection bracket 116, 118 has a duct 140a, 140b connected to its fluid cavity 138a, 138b, but in this case the ducts 140a, 140b are positioned radially rather than longitudinally. In addition, the piston 136 contains a further duct 140c which connects the two fluid cavities 138a, 138b.

The piston 136 and each of the fluid cavities 138a, 138b co-operatively form piston pump mechanisms as described above. Moving the connection brackets 116, 118 towards the second position pulls the piston 136 outwards from within one or both of the fluid cavities 138a, 138b, sucking grease into the or each cavity through its associated duct 140a, 140b (and potentially from one fluid cavity to the other through the duct 140c in the piston 136). Similarly, moving the connection brackets 116, 118 towards the first position pushes the piston 136 deeper into one or both of the fluid cavities 138a, 138b, forcing grease out of the or each cavity through its associated duct 140a, 140b (and potentially from one fluid cavity to the other through the duct 140c in the piston 136).

The arrangement of FIG. 20 also comprises chains 114 of increased length. The chain assembly 112 therefore comprises an alignment structure 128 to prevent the chains 114 touching as described previously. In this case, the alignment structure 128 takes the form of an enlarged section of the piston 136, providing a section of large enough radius to space apart the middle portions of the chains 114 and prevent them touching.

Figure 21:
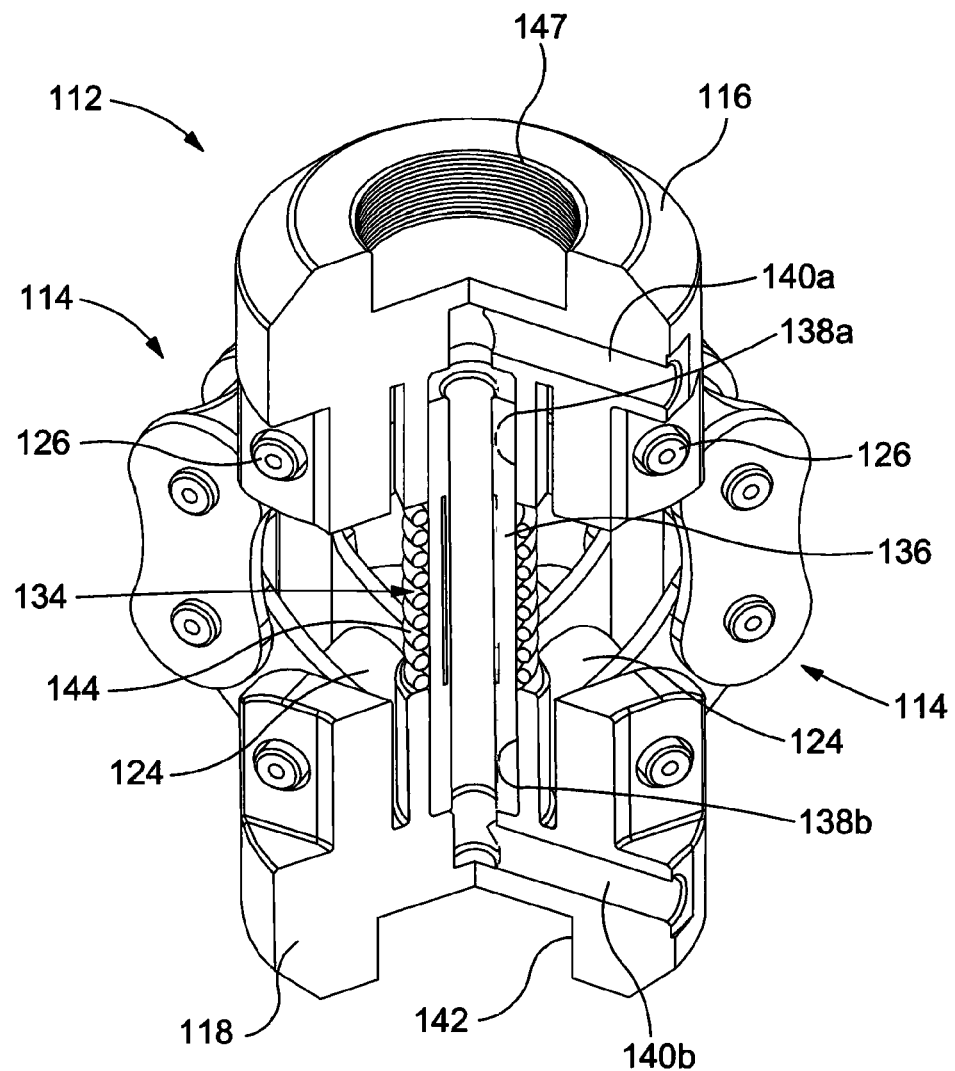
FIG. 21 is a perspective cutaway view of a modification of the embodiment of FIG. 20.

FIG. 21 shows a modification of the arrangement of FIG. 20. In this case, the piston 136 of the damper sub-assembly 134 is not provided with an alignment structure (128 in FIG. 20) since the chains 114 will not touch each other due to their being relatively short and due to the resilient elongate flexible member 120 being positioned to urge the middle portions of the chains 114 outwards (i.e. away from each other). In this arrangement, a resiliently deformable element in the form of a coil spring 144 is positioned around the piston, between the first and second connection brackets 116, 118 and attached thereto. The spring 144 is at its natural length when the connection brackets 116, 118 are in the first position, therefore moving the connection brackets apart (i.e. towards the second position) stretches the spring and causes it to urge them back together (towards the first position). Similarly, moving the connection brackets 116, 118 closer together (beyond the first position) compresses the spring and causes it to urge them apart (towards the first position). The spring 144 therefore works with the chains 114 in providing additional resistance to extension of the chain assembly 114, and also allows the assembly 112 to resist compressive loads.

In other embodiments, the spring 144 may only act in tension to supplement the restorative force from the chains 114, or may only act in compression so as to allow the assembly 112 to react to compressive loads (in which case the spring may simply be held between the connection brackets 116, 188, rather than being attached thereto). Further, though in this embodiment no alignment structure is needed, in other embodiments this may be included as well. For instance, the spring 140 may be of diameter sufficient to allow it to function as an alignment structure as described in relation to FIG. 20.

Figure 22:
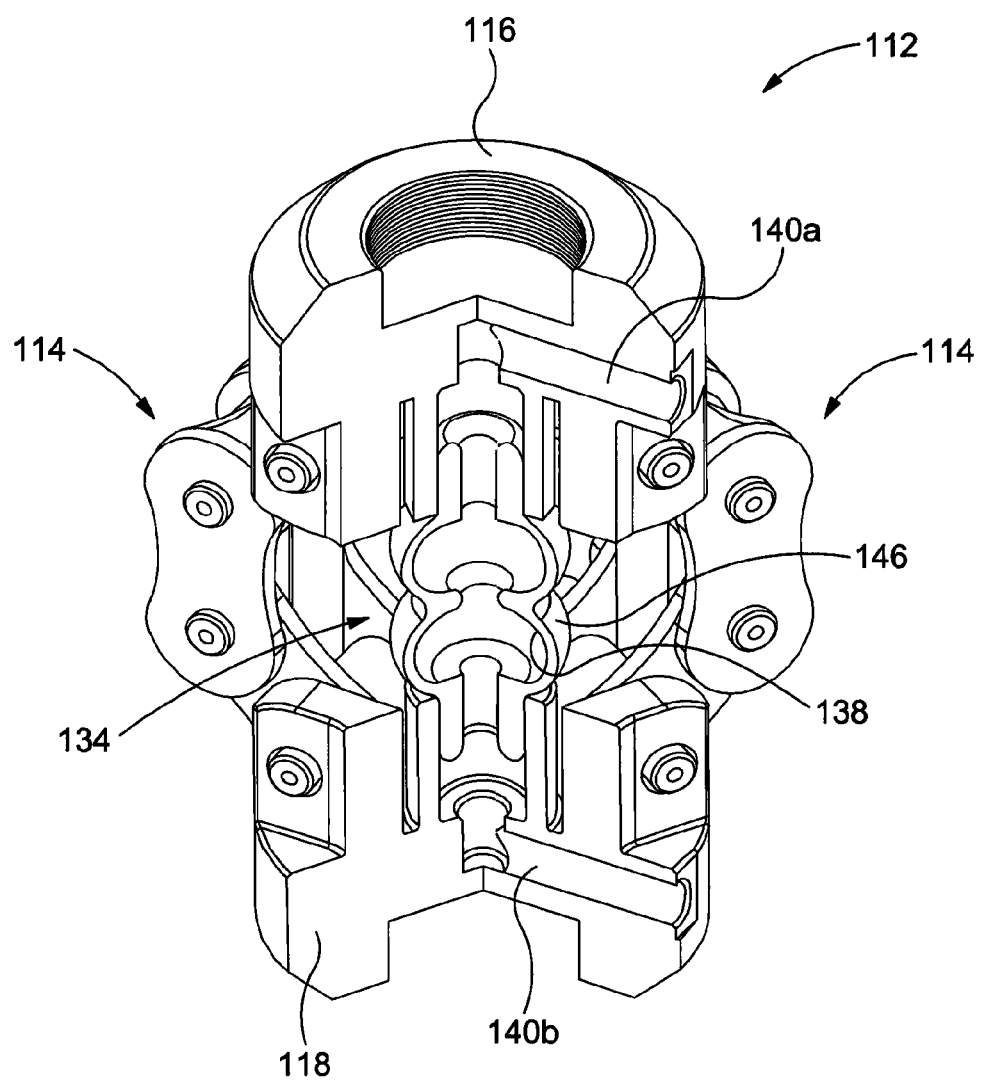
FIG. 22 is a perspective cutaway view of a modification of the embodiment of FIG. 21.

FIG. 22 shows a modification of the arrangement of FIG. 21. In this spring assembly 112 the damper sub-assembly 134 takes the form of a deformable bladder 146 which defines a bifurcated fluid cavity 138 therein. The bladder 146 is attached to each connection bracket 116, 118 so that relative movement of the connection brackets changes the shape of the bladder, which in turn changes the shape of the fluid cavity 138. For example, moving the connection brackets 116, 118 towards the second position stretches the bladder axially (vertically from the perspective of FIG. 22).

In this case, the bladder 146 is shaped so that deforming it not only changes the shape of the fluid cavity 138, but also changes the volume of the fluid cavity. The bladder can therefore function as a pump for damping fluid such as grease, as outlined in relation to FIG. 19. For instance, moving the connection brackets 116, 118 together deforms the bladder 146 and reduces the volume of the fluid cavity 138, forcing grease out of the cavity through one or both of the ducts 140a, 140b, and moving them apart increases the volume of the fluid cavity, sucking grease back into it. The bladder may instead pump another fluid such as a gas, however due to gas being of lower viscosity than grease the damping effect may be reduced.

The chain assembly 112 of FIG. 22 may instead provide damping by displacing fluid by changing the shape of the fluid cavity 138, without the volume of the cavity necessarily changing. For instance, the cavity 138 may be filled with grease and sealed (for instance by inserting plugs into the ducts 140a, 140b). Deformation of the bladder 146 (and thus of the cavity 138) would dissipate energy by forcing the grease within the cavity 134 to move within the cavity to conform to its new shape. As another example, the fluid cavity 138 may be a sealed pocket of gas such as air, allowing it to function as an air damper.

As an additional point, it is to be noted that if the bladder 146 is made of a resiliently deformable material, and/or if the fluid cavity comprises a sealed volume of compressible fluid (i.e. gas), the bladder may also constitute a resiliently deformable element as described in relation to FIG. 21.

It will be appreciated that numerous modifications to the above described design may be made without departing from the scope of the invention as defined in the appended claims. For example, the particular manner in which the elongate flexible member is threaded through the chain may vary depending on the application. Moreover, for any of the embodiments covered by the claims the rollers may be made from a polymeric damping material to improve the damping performance of the chain. The material may be injection mouldable for ease of manufacture. In one embodiment the material may be Nylon 6 but many other options would be readily appreciated by the skilled person. The size and/or thickness of the rollers may vary along the length of the chain in order to provide different damping characteristics along the chain. Alternatively, the material of the rollers may vary along the length of the chain to achieve the same effect.

For the avoidance of doubt, although in the described embodiment of a chain assembly the connection brackets are moved towards the second position by moving them directly apart, in other embodiments they may be movable towards the second position in any other suitable fashion. For instance, they may be moved towards the second position by rotation, pivoting, and/or movement towards and/or tangentially relative to one another, instead or in addition to movement away from one another.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A chain having a longitudinal axis and comprising a plurality of links pivotally interconnected by transverse articulation elements, the chain having a straight configuration in which the links are substantially aligned in a linear direction and at least one resilient elongate flexible member threaded along at least part of the length of the chain between the articulation elements in alternate directions so as to force adjacent links of the chain to articulate out of the straight configuration, wherein the at least one resilient elongate flexible member comprises substantially planar upper and lower surfaces.

2. A chain according to claim 1, wherein the elongate flexible member is threaded through the chain such that it passes alternately above and below successive articulation elements.

3. A chain according to claim 1, wherein the elongate flexible member is discontinuous along the length of the chain.

4. A chain according to claim 1, wherein at least one of the thickness and the width of the elongate flexible member varies along the length of the chain.

5. A chain according to claim 1, wherein there is provided a plurality of elongate flexible members disposed in a side-by-side relationship along the length of the chain.

6. A chain according to claim 1, wherein there are provided rollers arranged for rotation around the articulation elements, the elongate flexible member being threaded so as to bear against the rollers.

7. A chain according to claim 6, wherein the rollers are made, at least in part, from a resilient material so as to provide damping.

8. A chain according to claim 7, wherein the material, size or shape of the rollers varies along the chain length such that the damping characteristics vary.

9. A chain according to claim 1, wherein the links comprise inner link members interconnected by outer link members, the inner link members being free to articulate about the transverse articulation elements and the outer link members being fixed relative to the articulation elements.

10. A chain according to claim 1, wherein the resilient elongate flexible member provides damping.

11. A chain according to claim 1, wherein the resilient elongate flexible member has a plurality of protuberances spaced apart along its length for contact with the links of the chain, the protuberances providing a damping effect.

12. A chain according to claim 1, wherein the resilient elongate flexible member is bonded to at least some of the links.

13. A chain according to claim 1, the chain is configured to be disposed between guide members for guiding movement of the chain.

14. A chain according to claim 13, wherein the guide members are movable towards and away from each other so as to force the chain between a first position in which the elongate flexible member is relaxed and a second position in which it is deformed and applies a reactive force to the links of the chain.

15. A method for proof loading a chain, the chain having a longitudinal axis and comprising a plurality of links pivotally interconnected by transverse articulation elements, the chain having a straight configuration in which the links are substantially aligned in a linear direction, the method comprising threading a resilient elongate flexible member along at least part of the length of the chain between the articulation elements in alternate directions so as to force adjacent links of the chain to articulate out of the straight configuration, the resilient elongate flexible member having substantially planar upper and lower surfaces, and then applying a tensile load to the chain so as to move the chain towards the straight configuration and to deflect the elongate flexible member.

16. A chain assembly comprising a plurality of chains, each according to claim 1, each running between a first connection bracket and a second connection bracket, wherein the first and second connection brackets are movable relative to one another between a first position and a second position and are arranged to urge each of the chains towards the straight configuration when they are moved towards the second position.

17. A chain assembly according to claim 16 wherein each of said chains defines an articulation plane within which the links can pivot, and the plurality of chains are positioned whereby their respective articulation planes are substantially parallel.

18. A chain assembly according to claim 16 wherein each of said chains defines an articulation plane within which the links can pivot, and at least two of said chains are positioned whereby their respective articulation planes are non-parallel.

19. A chain assembly according to claim 16 further comprising a damper sub-assembly configured to damp movement of the first and second connection brackets relative to one another.

20. A chain assembly according to claim 16 further comprising a resiliently deformable element configured to be deformed by relative movement of the first and second connection brackets.

21. A chain assembly according to claim 16 further comprising an alignment structure positioned to prevent at least two of the chains from contacting each other.

22. A chain assembly according to claim 20, wherein the resiliently deformable element is configured to be deformed by movement of the first and second connection brackets towards at least one of the first position and the second position.

23. A power transmission device comprising a chain according to claim 1, wherein application of an input force in a direction transverse to the longitudinal axis of the chain is translated into a output force directed along the longitudinal axis of the chain by virtue of the chain moving towards the straight configuration.

* * * * *